United States Patent [19]

Yamauchi et al.

[11] 4,190,554

[45] Feb. 26, 1980

[54] METHOD FOR REACTIVATION OF PLATINUM GROUP METAL CATALYST WITH AQUEOUS ALKALINE AND/OR REDUCING SOLUTIONS

[75] Inventors: Kiaki Yamauchi; Yukihiko Morimoto; Toshikatu Sasaki; Katsumi Nakai, all of Osaka, Japan

[73] Assignee: Osaka Gas Company, Ltd., Osaka, Japan

[21] Appl. No.: 972,868

[22] Filed: Dec. 26, 1978

Related U.S. Application Data

[63] Continuation-in-part of Ser. No. 861,521, Dec. 16, 1977, Pat. No. 4,147,660.

[30] Foreign Application Priority Data

| Dec. 22, 1976 | [JP] | Japan | 51/155512 |
| Feb. 15, 1977 | [JP] | Japan | 52/15635 |
| Apr. 25, 1977 | [JP] | Japan | 52/48285 |
| Apr. 25, 1977 | [JP] | Japan | 52/48286 |
| Apr. 27, 1977 | [JP] | Japan | 52/49507 |

[51] Int. Cl.$^2$ .................. B01J 23/96; B01J 29/38; C10G 13/10

[52] U.S. Cl. .................. 252/412; 208/108; 208/111; 252/416

[58] Field of Search ............... 252/412, 414, 416, 420, 252/411 R, 411 S; 208/111

[56] References Cited

U.S. PATENT DOCUMENTS

| 1,980,829 | 11/1934 | Ridler | 252/414 |
| 3,374,182 | 3/1968 | Young | 208/111 |
| 3,824,193 | 7/1974 | Williams et al. | 252/412 |
| 3,959,382 | 5/1976 | Yeh et al. | 252/411 S |
| 4,148,750 | 4/1979 | Pine | 208/111 |

*Primary Examiner*—P. E. Konopka
*Attorney, Agent, or Firm*—Larson, Taylor and Hinds

[57] ABSTRACT

A method for reactivation of a platinum group metal catalyst which comprises treating the platinum group metal catalyst lowered in catalytic activity as the result of having been used for the catalytic reaction of hydrocarbons optionally containing an oxygen atom with at least one agent selected from an inorganic alkaline substance and a reducing substance in an aqueous medium.

11 Claims, No Drawings

METHOD FOR REACTIVATION OF PLATINUM GROUP METAL CATALYST WITH AQUEOUS ALKALINE AND/OR REDUCING SOLUTIONS

This is a continuation-in-part application of our copending application Ser. No. 861,521 filed Dec. 16, 1977 now U.S. Pat. No. 4,147,660, issued Apr. 3, 1979.

The present invention relates to a method for reactivation of a platinum group metal catalyst. More particularly, it relates to a method for reactivation of a platinum group metal catalyst lowered in catalytic activity as the result of having been used for the catalytic reaction of hydrocarbons optionally containing an oxygen atom.

Conventional catalysts of this type which have been used in the catalytic reaction of hydrocarbons optionally containing an oxygen atom, such as in the steam-reforming of hydrocarbons, hydro-cracking of hydrocarbons, partial oxidation of hydrocarbons and steam-reforming of alkanols, include base metal (e.g. Fe, Ni, Co) catalysts and noble metal (e.g. Pt, Pd, Ru) catalysts. In comparison with the base metal catalysts (particularly nickel catalysts), the noble metal catalysts (particularly platinum group metal catalysts) possess certain advantages as, for instance, resistance to the deposition of carbonaceous materials thereon and maintenance of high catalytic activity with use in small amounts. However, due to the expensiveness of the noble metal catalysts, the practical considerations have been concentrated in the use of the base metal catalysts. In order to overcome this shortcoming, attempts have been made to reactivate noble metal catalysts lowered in the catalytic activity so as to enable their reuse. Typical conventional procedures for such reactivation include treatment with hydrogen, steam or oxygen, and in fact, such procedures are quite effective in the elimination of certain poisonous materials in addition to the carbonaceous materials deposited on the catalysts. However, the recovery of the catalytic activity provided by these procedures is frequently not satisfactory.

In general, catalytic reactions of hydrocarbons optionally containing an oxygen atom in the presence of a platinum group metal catalyst result in deposition of various materials such as carbonaceous materials and sulfurous materials on the catalyst particles. In addition, these catalytic reactions often result in a sintering of the catalyst particles causing their mutual cohesion, whereby the particle size of the catalyst enlarged and the dispersibility of the catalyst consequently lowered. Further, the physical and chemical constitutions and behaviors of the catalysts may be gradually changed during the catalytic reactions. Due to these and other factors which are still unclear, the catalytic activity of the catalyst is lowered during the course of the catalytic reaction. In order for recovery of the catalytic activity to reach a practically satisfactory level, it is necessary to substantially reduce or eliminate these adverse factors.

As the result of extensive study, it has now been found that treatment of platinum group metal catalysts lowered in catalytic activity by contact with at least one agent selected from an inorganic alkaline substance and a reducing substance in an aqueous medium provides an effective recovery of the catalytic activity. It has also been found that the combination of treatments with both an inorganic alkaline substance in an aqueous medium and a reducing substance in an aqueous medium is particularly effective for accomplishment of the reactivation. It has further been found that the reactivation effected by the treatment with the inorganic alkaline substance and/or the reducing subtance can be more assured by treating the catalyst lowered in catalytic activity with hydrogen, steam or oxygen before or after the treatment with the inorganic alkaline substance and/or the reducing substance.

It may be noted that conventional treatment with hydrogen, steam or oxygen is effective for the removal of carbonaceous materials deposited on the catalyst but not for the elimination of sulfurous materials. On the other hand, treatment with an inorganic alkaline substance or a reducing substance is highly effective for the removal of sulfurous materials though the effect of elimination of carbonaceous materials may not be as high as obtained by conventional treatment with hydrogen, steam or oxygen. Particularly notable is the fact that while the conventional treatment has almost no effect on the recovery of the lowered catalytic activity, treatment with an inorganic alkaline substance or a reducing substance has a surprisingly significant effect.

According to the present invention, the reactivation of a platinum group metal catalyst lowered in the catalytic activity is carried out by treatment of the catalyst with at least one inorganic alkaline substance or at least one reducing substance or both, in an aqueous medium.

The platinum group metal catalyst to be subjected to the treatment in the present invention may be the one which comprises a platinum group metal such as ruthenium, rhodium, palladium, osmium, iridium or platinum as the catalyst component deposited on a carrier material such as alumina, magnesia, zirconia, titania, silica, silica-alumina, silica-magnesia, alumina-magnesia or carbon and lowered in catalytic activity as the result of having been used for the catalytic reaction of hydrocarbons optionally containing an oxygen atom. In addition to the said essential catalyst component, the platinum group metal catalyst may comprise any additive which does not materially afford any unfavorable influence thereon. Examples of the additive include any material known as the so-called "co-catalyst" such as alkali metals, alkaline earth metals, iron, copper, nickel, cobalt, chromium, tungsten, manganese or molybdenum. The term "hydrocarbons optionally containing an oxygen atom" hereinabove used is intended to mean organic compounds consisting of carbon atoms and hydrogen atoms or of carbon atoms, hydrogen atoms and oxygen atoms, and their examples include aliphatic hydrocarbons, aromatic hydrocarbons, naphthenic hydrocarbons, alkanols, alkanones, etc. Examples of the catalytic reaction are steam-reforming of hydrocarbons, hydro-cracking of hydrocarbons, partial oxidation of hydrocarbons, steam-reforming of alkanols, etc.

The inorganic alkaline substance may be an inorganic alkaline compound containing at least one alkali metal or alkaline earth metal. Examples of the alkali metals and the alkaline earth metals are sodium, potassium, calcium, magnesium, barium, strontium, etc. Preferred examples of the inorganic alkaline compounds containing these alkali metals and alkaline earth metals are hydroxides, carbonates, nitrates, sulfates, etc. or mixtures thereof. The concentration of the inorganic alkaline substance in the aqueous medium may be varied depending upon the amount of the catalyst component deposited on the carrier material, the degree of lowered catalytic activity, the temperature and pressure at which the reactivation treatment is carried out and the like. In general, however, the concentration is usually from about 0.001 to 10 N, preferably from about 0.001 to 5 N.

As the reducing substance, there may be employed normally water-soluble or water-dispersible reducing substances such as hydrazine, formaldehyde, sodium borohydride, lithium aluminum hydride, sodium tartrate, potassium tartrate, sodium potassium tartrate, calcium tartrate, sodium hydrogen tartrate, sodium formate, potassium formate, calcium formate, glucose, etc. or mixtures thereof. The concentration of the reducing substance in the aqueous medium depends on the amount of the catalyst component deposited on the carrier material, the degree of lowered catalytic activity, the temperature and pressure employed in the reactivation treatment, etc. Normally it falls in the range of about 0.01% to 10% by weight.

Even when the catalyst lowered in catalytic activity is treated solely with the inorganic alkaline substance or the reducing substance, appreciable elimination of sulfurous materials deposited on the catalyst and considerable recovery of the catalytic activity can be attained by choosing appropriate conditions for the treatment. In general, however, the treatment is preferably carried out in two separate steps, i.e. by treatment with the inorganic alkaline substance and then treatment with the reducing substance, or vice versa. When desired, such as two step treatment may be repeatedly applied until a satisfactory recovery of the catalytic activity is achieved, though a single application of two step treatment is usually sufficient.

The treatment with the inoganic alkaline substance is usually effected at room temperature (i.e. about 5° to 30° C.) or while heating under atmospheric pressure or an elevated pressure. Howver, it can be widely varied depending on the extent of lowered catalytic activity, the composition of the catalyst, the kind of the inorganic alkaline substance employed, etc. In general, a higher temperature affords a better result, but too high a temperature should be avoided since the carrier material may be unfavorably dissolved. Thus, the temperature is usually from about 5° to 250° C., preferably from about 50° to 200° C. The pressure may be appropriately selected so as to maintain the system for treatment in a liquid state, and such pressure do not usually exceed 50 kg/cm$^2$.

Treatment with the reducing substance may be carried out at a temperature from room temperature to the decomposition temperature of the reducing substance under atmospheric pressure or at an elevated pressure. Although the temperature is considerably affected by various factors such as the extent to which the catalytic activity is lowered, the composition of the catalyst and the kind of the reducing substance, the temperature is ordinarily between room temperature and about 250° C. insofar as the reducing substance is not decomposed. The pressure may be appropriately selected so as to keep the system in a liquid state and is normally not higher than 50 kg/cm$^2$.

When combined two step treatments with the inorganic alkaline substance and with the reducing substance are effected in this order or vice versa, these may be performed with or without intervention of water-washing and/or drying between them.

The treatment(s) with the inorganic alkaline substance and/or with the reducing substance may be effected until a satisfactory recovery of the catalytic activity is attained. Usually, treatment(s) effected so as to eliminate not less than about 40% of carbonaceous materials and not less than about 70% of sulfurous materials deposited on the catalyst will achieve the satisfactory recovery of the catalytic activity. The contact or treating time employed will vary depending upon many factors such as whether one or two step treatments are used, the degree of recovery of catalytic activity desired, etc. Usually a treating time of several minutes to several tens hours (e.g. 3 minutes to 80 hours) is generally sufficient to achieve the aforementioned satisfactory recovery of catalytic activity. However, as stated above, the deterioration of the catalytic activity is caused not only by deposition of carbonaceous and/or sulfurous materials but also by other unclear factors, and therefore the elimination of the said deposited materials may not always be sufficient for recovery of the catalytic activity. If necessary, therefore, the said treatment(s) with the inorganic alkaline substance and/or with the reducing substance may be carried out in combination with any conventional reactivation treatment. For instance, the treatment of the catalyst with hydrogen, steam or oxygen may be effected prior to, between or subsequent to the treatment(s) with the inorganic alkaline substance and/or with the reducing substance.

Examples of usable gases for the conventional reactivation treatment are hydrogen, oxygen, steam, a mixture of hydrogen and steam, a mixture of oxygen and steam, etc. These gases may be optionally diluted with any other inert gas such as nitrogen, helium or argon. Particularly preferred are (1) hydrogen, (2) a mixture of hydrogen and steam having a hydrogen content of not less than about 30 mol%, (3) a mixture of steam and a gaseous diluent having a steam content of not less than about 30 mol %, (4) a mixture of oxygen and a gaseous diluent having an oxygen content of not less than about 0.5% by volume, (5) a mixture of oxygen, steam and a gaseous diluent having an oxygen content of not less than about 0.5% by volume and a steam content of not less than about 30% by volume, etc.

The conditions for treatment with the said gases depend on the amount of the catalyst component deposited on the carrier material, the deposited amount of poisonous materials (particularly carbonaceous materials), the concentration of the active gases, the kind of other treatment procedures employed, etc. Usually a temperature of about 350° to 750° C. and a pressure of about 1 to 50 atm. (absolute) are adopted. The treatment may be continued until the deposited amount of poisonous materials, particularly carbonaceous materials, is appreciably decreased. When the deposited amount of carbonaceous materials is relatively large, the generation of heat occurs sometimes. In such case, the oxygen content in the treating gases may be decreased or the use of the treating gases containing no oxygen is preferred.

After the finalization of the treatment(s) as explained above, the resulting catalyst may be washed with water and/or dried. Particularly, when the final step is the treatment with the inorganic alkaline substance or the reducing agent in an aqueous medium, water washing and drying are favorable.

As stated above, the thus reactivated catalyst is satisfactorily recovered in catalytic activity. Even when the catalyst is severely poisoned and its catalytic activity is extremely lowered, the repeated application of the above treatment(s) enables the satisfactory recovery of catalytic activity nearly equal to that of a freshly prepared catalyst. Further, when the once reactivated catalyst is lowered again in the catalytic activity, the repeated application of the above treatment(s) will reactivate it. Thus, the present invention is quite advantageous in making it possible to use an expensive platinum group metal catalyst repeatedly.

Practical and presently preferred embodiments of the present invention are illustratively shown in the following Examples wherein part(s) and % are by weight unless otherwise indicated. The amount of the catalyst required for reaction indicates a minimum amount of the catalyst required for showing a catalytic activity for reaction.

EXAMPLE 1

A catalyst comprising 2.0% of ruthenium and 0.1% of chromium oxide deposited on spheroidal particles of alumina of 4 mm in diameter as a carrier material (hereinafter referred to as "Catalyst $A_1$") (325 ml) was charged into a tubular reactor of 1 inch in diameter, and a gaseous mixture comprising naphtha (content of sulfur, 2 ppm; final boiling point, 168° C.), steam, hydrogen, methane and carbon oxides was fed therein to effect continuously steam-reforming reaction for 1500 hours under the following conditions:

Temperature of reactor: inlet, 450° C., outlet, 524° C.;
Space velocity: 2000 (l/hr);
Ratio of steam/hydrocarbon: 0.9 (number of oxygen atoms per one carbon atom in the feeding gaseous mixture);
Pressure: 13 atm. (absolute)

After 1500 hours, the resultant catalyst (hereinafter referred to as "Catalyst $B_1$") was treated under the conditions as shown in Table 1 for reactivation. The reactivated catalyst was reused in steam-reforming reaction under the same conditions as mentioned above. The results are shown in Table 1.

As seen from Table 1, the reactivation treatment with hydrogen is extremely effective for elimination of carbonaceous materials, but removal of sulfurous materials is insufficient and the dispersibility can be hardly recovered so that recovery of the catalytic activity is scarcely observed (Catalysts $C_1$-1 and $C_1$-2). In the case of treatment with an inorganic alkaline substance, elimination of sulfurous materials and recovery of the dispersibility as well as recovery of the catalytic activity are good.

Table 1

| Catalyst | | $A_1$ | $B_1$ | $C_1$-1 | $C_1$-2 | $D_1$-1 | $D_1$-2 | $D_1$-3 | $D_1$-4 | $D_1$-5 | $D_1$-6 | $D_1$-7 | $D_1$-8 | $D_1$-9 | $D_1$-10 | $D_1$-11 | $D_1$-12 |
|---|---|---|---|---|---|---|---|---|---|---|---|---|---|---|---|---|---|
| | | | | | | Reactivated | | | | | | | | | | | |
| Conditions of treatment for reactivation | Reactivating agent* | — | — | $H_2$ | $O_2:N_2$ (=21:79 by volume) | 0.375N NaOH | 0.375N NaOH | 0.375N NaOH | 1.0N NaOH | 5.0N NaOH | 0.375N $Na_2CO_3$ | 0.375N KOH | 0.375N $Ba(OH)_2$ | 0.375N $Sr(OH)_2$ | 0.375N NaOH | 0.375N NaOH | 0.001N NaOH |
| | Temperature (°C.) | — | — | 650 | 500 | 50 | 70 | 100 | 100 | 70 | 100 | 100 | 100 | 100 | 148 | 205 | 100 |
| | Pressure (ata) | — | — | 6.0 | 6.0 | 1.0 | 1.0 | 1.0 | 1.0 | 1.0 | 1.0 | 1.0 | 1.0 | 1.0 | 5.0 | 20.0 | 1.0 |
| | Time (hrs) | — | — | 12 | 5 | 6.0 | 3.0 | 1.5 | 0.75 | 0.5 | 3.0 | 3.0 | 3.0 | 3.0 | 1.0 | 0.5 | 10.0 |
| | Post-treatment | — | — | — | — | | | | | | Water washing: 100° C., 2 hrs. Drying: 100° C., 16 hrs. | | | | | | |
| Elimination percentage of | Carbonaceous materials | — | — | 100 | 100 | 41 | 46 | 55 | 54 | 59 | 54 | 52 | 50 | 48 | 56 | 58 | 40 |
| | Sulfurous materials (%) | — | — | 33 | 40 | 78 | 84 | 95 | 97 | 100 | 93 | 90 | 87 | 87 | 100 | 100 | 80 |
| Specific surface area ($m^2$/g-Ru) | | 43 | 20 | 19 | 17 | 28 | 30 | 35 | 37 | 37 | 36 | 35 | 33 | 32 | 34 | 37 | 30 |
| Amount of catalyst required for reaction (ml) | | 52.5 | — | — | — | 85 | 68 | 63 | 63 | 61 | 64 | 64 | 66 | 68 | 63 | 60 | 69 |

*In case of Catalysts $C_1$-1 and $C_1$-2, the treatment was carried out with a space velocity of 2500 (1/hr).

EXAMPLE 2

A catalyst comprising 0.3% of ruthenium deposited on spheroidal particles of alumina of 4 mm in diameter as a carrier material (1000 ml) was charged into a tubular reactor of 1 inch in diameter, and naphtha (final boiling point, 108° C.) and hydrogen were fed therein to effect continuously hydro-cracking reaction under the following conditions:

Temperature of reactor at inlet: 265° C;
Pressure: 46 atm. (absolute);
Ratio of hydrogen/hydrocarbon: 1.20 (by mol)
Mass velocity: 500 kg-mol/m$^2$. hr The conversion of hydrogen at the initial stage was 82%, and the catalytic activity was materially decreased after about 200 hours. The resultant catalyst was heated in a 0.375 N aqueous solution of sodium hydroxide at 100° C. for 3 hours, washed with water at 100° C. for 2 hours and then dried at 100° C. for 16 hours. The thus reactivated catalyst was reused for hydro-cracking under the same conditions as above, whereby a conversion of hydrogen of 80% was observed.

EXAMPLE 3

A catalyst comprising 2.6% of ruthenium and 0.1% of chromium oxide deposited on spheroidal particles of alumina of 4 mm in diameter as a carrier material (hereinafter referred to as "Catalyst $A_2$") (325 ml) was charged into a tubular reactor of 1 inch in diameter, and a gaseous mixture comprising naphtha (content of sulfur, 2 ppm; final boiling point, 168° C.), steam, hydrogen, methane and carbon oxides was fed therein to effect continuously steam-reforming reaction for 2400 hours under the following conditions:

Temperature of reactor: inlet, 400° C., outlet, 517° C;
Space velocity: 1500 (l/hr);
Ratio of steam/hydrocarbon: 0.7 (number of oxygen atoms per one carbon atom in the feeding gaseous mixture);
Pressure: 13 atm. (absolute)

After 2400 hours, the resultant catalyst (hereinafter referred to as "Catalyst $B_2$") was treated under the conditions as shown in Table 2 for reactivation. The reactivated catalyst was reused in steam-reforming reaction under the same conditions as mentioned above. The results are shown in Table 2.

As seen from Table 2, the reactivation treatment with hydrogen is extremely effective for elimination of carbonaceous materials, but removal of sulfurous materials is insufficient and the dispersibility can be hardly recovered so that recovery of the catalytic activity is scarcely observed (Catalyst $C_2$). In the case of treatment with an inorganic alkaline substance at room temperature, elimination of sulfurous materials and recovery of the dispersibility are relatively good when the treating time is long, but the recovery of the catalytic activity is insufficient (Catalysts $D_2$-1 and $D_2$-2). The treatment with an inorganic alkaline substance under heating is proved to be effective for recovery of the catalytic activity (Catalysts $D_2$-3 to $D_2$-5). In the treatment with a reducing substance, elimination of sulfurous material is good, but removal of carbonaceous materials is hardly attained. There is a tendency to recovery of the catalytic activity (Catalysts $D_2$-6 to $D_2$-13).

Table 2

| Catalyst | | A₂ | B₂ | C₂ | D₂-1 | D₁-2 | D₁-3 | D₁-4 | D₂-5 | D₂-6 | D₂-7 | D₂-8 | D₂-9 | D₂-10 | D₂-11 | D₂-12 | D₂-13 |
|---|---|---|---|---|---|---|---|---|---|---|---|---|---|---|---|---|---|
| | | | | | | | | | | | | | | | Reactivated | | |
| Conditions of treatment for reactivation | Reactivating agent* | — | — | H₂ | 0.375N NaOH | 0.375N NaOH | 0.375N NaOH | 0.375N NaOH | 0.375N NaOH | 0.4% Hydrazine | 0.3% Lithium aluminum hydride | 0.7% Sodium tartrate | 2.0% Sodium formate | 0.3% Glucose | 1.0% Hydrazine | 1.0% Formaldehyde | 1.0% Sodium borohydride |
| | Temperature (°C.) | — | — | 650 | 30 | 30 | 50 | 100 | 148 | 20 | 20 | 20 | 20 | 60 | 60 | 60 | |
| | Pressure (ata) | — | — | 6.0 | 1.0 | 1.0 | 1.0 | 1.0 | 5.0 | 1.0 | 1.0 | 1.0 | 1.0 | 1.0 | 1.0 | 1.0 | 1.0 |
| | Time (hrs) | — | — | 12.0 | 3.0 | 10.0 | 6.0 | 3.0 | 1.0 | 3.0 | 3.0 | 3.0 | 3.0 | 3.0 | 3.0 | 3.0 | 3.0 |
| | Post-treatment | — | — | — | Water washing: 100° C., 2 hrs. Drying: 100° C., 16 hrs. | | | | | Water washing: 75° C., 3 hrs. Drying: 100° C., 16 hrs. | | Water washing: 75° C., 3 hrs. Drying: 100° C., 16 hrs. | | | | | |
| Elimination percentage of | Carbonaceous materials | — | — | 100 | 12 | 41 | 43 | 52 | 56 | 0 | 0 | 0 | 0 | 0 | 0 | 0 | 0 |
| poisonous (%) | Sulfurous | — | 71 | 31 | 32 | 72 | 78 | 90 | 100 | 68 | 49 | 46 | 53 | 49 | 90 | 67 | 88 |
| Specific surface area (m²/g-Ru) | | 43 | 71 | 17 | 21 | 27 | 28 | 34 | 35 | 21 | 23 | 23 | 23 | 23 | 23 | 23 | 23 |
| Amount of catalyst required for reaction (ml) | | 92 | — | — | — | — | 147 | 110 | 106 | 276 | 270 | 272 | 272 | 276 | 266 | 270 | 276 |

*In case of Catalyst C₂, the treatment was carried out with a space velocity of 2500 (1/hr).

EXAMPLE 4

The reactivated catalysts as obtained in Example 3 (Catalysts $D_2$-1 to $D_2$-4 and $D_2$-6 to $D_2$-12) were each subjected to further treatment for reactivation under the conditions as shown in Table 3. The thus reactivated catalysts were each reused for continuous steam-reforming under the same conditions as shown in Example 3. The results are shown in Table 3.

As seen from Table 3, the catalysts ($E_3$-1 to $E_3$-20) reactivated in two steps are much more recovered in catalytic activity than the catalysts ($D_2$-1 to $D_2$-4 and $D_2$-6 to $D_2$-12) reactivated in one step.

Table 3

| Catalyst used | E₃-1 D₂-1 | E₃-2 D₂-2 | E₃-3 D₂-3 | E₃-4 D₂-3 | E₃-5 D₂-4 | E₃-6 D₂-4 | E₃-7 D₂-6 | E₃-8 D₂-6 | E₃-9 D₂-11 | E₃-10 D₂-12 | E₃-11 D₂-1 | E₃-12 D₂-2 | E₃-13 D₂-3 | E₃-14 D₂-3 | E₃-15 D₂-4 | E₃-16 D₂-4 | E₃-17 D₂-7 | E₃-18 D₂-8 | E₃-19 D₂-9 | E₃-20 D₂-10 |
|---|---|---|---|---|---|---|---|---|---|---|---|---|---|---|---|---|---|---|---|---|
| Conditions of treatment for reactivation | | | | | | | | | | | | | | | | | | | | |
| Reactivating agent | 1.0% Hydrazine | 0.4% Hydrazine | 0.4% Hydrazine | 0.5% Formaldehyde | 0.4% Hydrazine | 0.3% Sodium borohydride | 0.375N NaOH | 0.375N NaOH | 0.375N NaOH | 0.375N NaOH | 0.3% Lithium aluminum hydride | 0.3% Lithium aluminum hydride | 0.7% Sodium tartrate | 2.0% Sodium formate | 0.3% Lithium aluminum hydride | 0.3% Glucose | 0.375N NaOH | 0.1N NaOH | 0.375N NaOH | 0.375N NaOH |
| Temperature (°C) | 60 | 20 | 20 | 20 | 20 | 20 | 50 | 100 | 100 | 80 | 20 | 20 | 20 | 20 | 20 | 20 | 50 | 100 | 100 | 80 |
| Pressure (ata) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Time (hrs) | 3.0 | 3.0 | 3.0 | 3.0 | 3.0 | 3.0 | 6.0 | 3.0 | 3.0 | 3.0 | 3.0 | 3.0 | 3.0 | 3.0 | 3.0 | 3.0 | 6.0 | 3.0 | 1.5 | 3.0 |
| Post-treatment | Water washing: 75° C., 3 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | | | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | | | | Water washing: 100° C., 2 hrs. Drying: 100° C., 16 hrs. | | | |
| Elimination percentage of carbonaceous materials (%) | 12 | 41 | 43 | 43 | 52 | 52 | 43 | 54 | 53 | 47 | 12 | 41 | 43 | 43 | 52 | 52 | 43 | 44 | 46 | 47 |
| Elimination percentage of sulfurous materials (%) | 89 | 91 | 93 | 93 | 97 | 95 | 91 | 97 | 95 | 89 | 66 | 86 | 89 | 90 | 95 | 95 | 89 | 88 | 93 | 92 |
| Specific surface area (m²/g-Ru) | 34 | 36 | 36 | 36 | 40 | 40 | 35 | 39 | 41 | 39 | 31 | 36 | 37 | 37 | 41 | 40 | 38 | 37 | 37 | 37 |
| Amount of catalyst required for reaction (ml) | 108 | 110 | 102 | 106 | 95 | 98 | 102 | 95 | 93 | 95 | 126 | 106 | 100 | 100 | 94 | 95 | 98 | 100 | 100 | 100 |

EXAMPLE 5

The reactivated catalyst obtained in Example 3 (Catalyst $D_2$-3) was treated with a 0.4% aqueous solution of hydrazine at 20° C. under 1 atm. (absolute) for 3 hours, washed with water at 75° C. for 3 hours and dried at 100° C. for 16 hours. Then, the resulting catalyst was again subjected to treatment with a 0.375 N aqueous solution of sodium hydroxide at 50° C. under 1 atm. (absolute) for 6 hours and treatment with a 0.41% aqueous solution of hydrazine at 20° C. under 1 atm. (absolute) for 3 hours, followed by washing with water at 75° C. for 3 hours and drying at 100° C. for 16 hours. The thus reactivated catalyst was used for steam-reforming under the same conditions as stated in Example 3. The results are as follows: elimination percentage of poisonous materials: carbonaceous materials, 75%; sulfurous material, 100%. Specific surface area: 42 $m^2$/g-Ru. Amount of catalyst required for reaction: 93 ml.

As seen from the above results, the repeating treatments with an inorganic alkaline substance and with a reducing substance are quite effective for reactivation of the catalyst.

EXAMPLE 6

The reactivated catalyst obtained in Example 3 (Catalyst $D_2$-3) was treated with a 0.7% aqueous solution of sodium tartrate at 20° C. under 1 atm. (absolute) for 3 hours, washed with water at 75° C. for 3 hours and dried at 100° C. for 16 hours. Then, the resulting catalyst was again subjected to treatment with a 0.375 N aqueous solution of sodium hydroxide at 50° C. under 1 atm. (absolute) for 6 hours and treatment with a 0.7% aqueous solution of sodium tartrate at 20° C. under 1 atm. (absolute) for 3 hours, followed by washing with water at 75° C. for 3 hours and drying at 100° C. for 16 hours. The thus reactivated catalyst was used for steam-reforming under the same conditions as stated in Example 3. The results are as follows: elimination percentage of poisonous materials: carbonaceous materials, 70%; sulfurous material, 100%. Specific surface area: 42 $m^2$/g-Ru. Amount of catalyst required for reaction: 93 ml.

As seen from the above results, the repeating treatments with an inorganic alkaline substance and with a reducing substance are quite effective for reactivation of the catalyst.

EXAMPLE 7

A catalyst comprising 3.8% of ruthenium deposited on spheroidal particles of alumina of 4 mm in diameter (hereinafter referred to as "Catalyst $A_4$") (325 ml) was charged into a tubular reactor of 1 inch in diameter, and naphtha (content of sulfur, 2 ppm; final boiling point, 220° C.) and steam were fed therein to effect continuously steam-reforming reaction from 750 hours under the following conditions:

Temperature of reactor: inlet, 510° C., outlet, 518° C.;
Space velocity: 2000 (l/hr);
Ratio of steam/hydrocarbon: 1.9 (number of oxygen atoms per one carbon atom in the feeding gaseous materials);
Pressure: 13 atm. (absolute)

After 750 hours, the catalyst (hereinafter referred to as "Catalyst $B_4$") was treated under the same conditions as shown in Table 4 for reactivation. The reactivated catalyst was reused in steam-reforming reaction under the same conditions as mentioned above. The results are shown in Table 4.

As seen from Table 4, treatment with an inorganic alkaline substance shows recovery of the catalytic activity, and treatment with a reducing substance shows a tendency to recovery of the catalytic activity. However, when the catalyst is severely polluted, an elevated temperature is necessary for satisfactory recovery of the catalytic activity by treatment with an inorganic alkaline substance.

Table 4

| Catalyst | A4 | B4 | C4 | D4-1 | D4-2 | D4-3 | D4-4 | D4-5 | D4-6 | D4-7 | D4-8 | D4-9 | D4-10 | D4-11 | D4-12 | D4-13 | D4-14 | D4-15 | D4-16 | D4-17 | D4-18 |
|---|---|---|---|---|---|---|---|---|---|---|---|---|---|---|---|---|---|---|---|---|---|
| Conditions of treatment for reactivation | | | | | | | | | | Reactivated | | | | | | | | | | | |
| Reactivating agent | — | — | H2 | 0.375N NaOH | 0.375N NaOH | 0.375N NaOH | 0.4% Hydrazine | 1.0% Formaldehyde | 1.0% Sodium borohydride | 0.375N Na2CO3 | 0.375N Ba(OH)2 | 0.375N Sr(OH)2 | 0.1N Na2CO3 | 0.375N Ba(OH)2 | 0.375N Sr(OH)2 | 0.5% Formaldehyde | 0.3% Sodium borohydride | 0.3% Lithium aluminum hydride | 0.7% Sodium tartrate | 2.0% Sodium formate | 0.3% Glucose |
| Temperature (°C.) | — | — | 650 | 30 | 50 | 100 | 20 | 60 | 60 | 100 | 100 | 100 | 100 | 80 | 100 | 20 | 20 | 20 | 20 | 20 | 20 |
| Pressure (ata) | — | — | 6.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Time | — | — | 12.0 | 3.0 | 6.0 | 3.0 | 3.0 | 3.0 | 3.0 | 3.0 | 3.0 | 3.0 | 3.0 | 3.0 | 1.0 | 3.0 | 3.0 | 3.0 | 3.0 | 3.0 | 3.0 |
| Post-treatment | — | — | — | Water washing: 100° C., 2 hrs. Drying: 100° C., 16 hrs. | Water washing: 100° C., Drying: 100° C., 16 hrs. | | — | — | — | Water washing: 100° C., Drying: 100° C., 16 hrs. | Water washing: 100° C., 16 hrs. Drying: 100° C., 16 hrs. | Water washing: 100° C., 2 hrs. | | | | Water washing: 100° C., 3 hrs. Drying: 100° C., 16 hrs. | Water washing: 75° C., 3 hrs. | | | |
| Elimination percentage of | Carbonaceous materials | — | 100 | 10 | 41 | 56 | 0 | 0 | 0 | 54 | 51 | 50 | 44 | 49 | 46 | 0 | 0 | 0 | 0 | 0 | 0 |
| | Sulfurous materials (%) | — | 29 | 30 | 80 | 94 | 72 | 71 | 90 | 91 | 89 | 86 | 77 | 80 | 79 | 56 | 70 | 51 | 49 | 57 | 52 |
| Specific surface area (m2/g-Ru) | 43 | 20 | 19 | 23 | 29 | 36 | 23 | 26 | 26 | 36 | 35 | 35 | 32 | 32 | 31 | 23 | 23 | 26 | 26 | 25 | 23 |
| Amount of catalyst required for reaction (ml) | 91 | — | — | — | 145 | 109 | 270 | 264 | 270 | 111 | 114 | 119 | 123 | 126 | 129 | 274 | 278 | 260 | 264 | 264 | 270 |

EXAMPLE 8

The reactivated catalysts as obtained in Example 7 (Catalysts $D_4$-1 to $D_4$-3, $D_4$-8 and $D_4$-10 to $D_4$-18) were each subjected to further treatment for reactivation under the conditions as shown in Table 5. The thus reactivated catalysts were each reused for continuous steam-reforming under the same conditions as shown in Example 7. The results are shown in Table 5.

As seen from Table 5, the catalysts ($E_5$-1 to $E_5$-19) reactivated in two steps are much more recovered in catalytic activity than the catalysts ($D_4$-1 to $D_4$-3, $D_4$-8 and $D_4$-10 to $D_4$-18) reactivated in one step.

Table 5

| Catalyst used | E5-1 D4-1 | E5-2 D4-3 | E5-3 D4-8 | E5-4 D4-8 | E5-5 D4-10 | E5-6 D4-11 | E5-7 D4-12 | E5-8 D4-13 | E5-9 D4-13 | E5-10 D4-14 | E5-11 D4-1 | E5-12 D4-2 | E5-13 D4-10 | D5-14 D4-11 | E5-15 D4-12 | E5-16 D4-15 | E5-17 D4-16 | E5-18 D4-17 | D5-19 D4-18 |
|---|---|---|---|---|---|---|---|---|---|---|---|---|---|---|---|---|---|---|---|
| Conditions of treatment for reactivation — Reactivating agent | 1.0% Sodium borohydride | 0.4% Hydrazine | 0.5% Formaldehyde | 0.5% Formaldehyde | 0.5% Formaldehyde | 1.0% Hydrazine | 0.3% Sodium borohydride | 0.375N NaOH | 0.1N NaOH | 0.375N KOH | 0.7% Sodium tartrate | 0.3% Glucose | 0.3% Lithium aluminum hydride | 2.0% Sodium formate | 0.3% Lithium aluminum hydride | 0.1N NaOH | 0.1N Na2CO3 | 0.375N Ba(OH)2 | 0.375N Sr(OH)2 |
| Temperature (°C.) | 60 | 20 | 20 | 60 | 20 | 60 | 20 | 100 | 100 | 80 | 20 | 20 | 20 | 20 | 20 | 100 | 100 | 80 | 100 |
| Pressure (ata) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Time (hrs) | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 1.0 |
| Post-treatment | Water washing: 75° C., 3 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | | | | | Water washing: 100° C., 2 hrs. Drying: 100° C., 16 hrs. | | | Water washing: 75° C., 3 hrs. Drying: 100° C., 16 hrs. | | | | | Water washing: 100° C., 2 hrs. Drying: 100° C., 16 hrs. | | | |
| Elimination percentage of poisonous materials (%) Carbonaceous materials | 10 | 56 | 51 | 51 | 44 | 49 | 46 | 54 | 44 | 52 | 10 | 41 | 44 | 49 | 46 | 47 | 44 | 49 | 46 |
| Sulfurous materials | 86 | 96 | 95 | 97 | 89 | 96 | 90 | 86 | 80 | 85 | 65 | 91 | 89 | 91 | 90 | 90 | 88 | 91 | 90 |
| Specific surface area (m²/g-Ru) | 36 | 41 | 41 | 41 | 36 | 41 | 35 | 41 | 36 | 36 | 32 | 37 | 40 | 37 | 36 | 41 | 40 | 37 | 35 |
| Amount of catalyst required for reaction (ml) | 109 | 93 | 97 | 93 | 106 | 97 | 116 | 95 | 102 | 106 | 123 | 102 | 98 | 102 | 106 | 96 | 100 | 102 | 112 |

EXAMPLE 9

The reactivated catalyst obtained in Example 7 (Catalyst $D_4$-13) was treated with a 0.1 N aqueous solution of sodium hydroxide at 100° C. under 1 atm. (absolute) for 3 hours, washed with water at 100° C. for 2 hours and dried at 100° C. for 16 hours. Then, the resulting catalyst was again subjected to treatment with a 0.5% aqueous solution of formaldehyde at 20° C. under 1 atm. (absolute) for 3 hours and treatment with a 0.1 N aqueous solution of sodium hydroxide at 100° C. under 1 atm. (absolute) for 3 hours, followed by washing with water at 100° C. for 2 hours and drying at 100° C. for 16 hours. The thus reactivated catalyst was used for steam-reforming under the same conditions as stated in Example 7. The results are as follows: elimination percentage of poisonous materials: carbonaceous materials, 80 %, sulfurous material, 100%. Specific surface area: 42 $m^2$/g-Ru. Amount of catalyst required for reaction: 92 ml.

As seen from the above results, the repeating treatments with a reducing substance and with an inorganic alkaline substance are quite effective for reactivation of the catalyst.

EXAMPLE 10

The reactivated catalyst obtained in Example 7 (Catalyst $D_4$-17) was treated with a 0.375 N aqueous solution of barium hydroxide at 80° C. under 1 atm. (absolute) for 3 hours, washed with water at 100° C. for 2 hours and dried at 100° C. for 16 hours. Then, the resulting catalyst was again subjected to treatment with a 2.0% aqueous solution of sodium formate at 20° C. under 1 atm. (absolute) for 3 hours and treatment with a 0.375 N aqueous solution of barium hydroxide at 80° C. under 1 atm. (absolute) for 3 hours, followed by washing with water at 100° C. for 2 hours and drying at 100° C. for 16 hours. The thus reactivated catalyst was used for steam-reforming under the same conditions as stated in Example 7. The results are as follows: elimination percentage of poisonous materials: carbonaceous materials, 76% sulfurous material, 100%. Specific surface area: 42 $m^2$/g-Ru. Amount of catalyst required for reaction: 92 ml.

As seen from the above results, the repeating treatments with an inorganic alkaline substance and with a reducing substance are quite effective for reactivation of the catalyst.

EXAMPLE 11

The reactivated catalysts obtained in Example 4 (Catalyst $E_3$-5) and in Example 4 (Catalyst $E_3$-7)) were each reused for steam-reforming under the same conditions as shown in Example 3. The results are shown in Table 6, from which it is understood that the reactivated catalysts show the similar behavior to the fresh catalyst (Catalyst $A_2$) in depression of the catalytic activity and their catalytic activity, particularly that of Catalyst $E_3$-5, is nearly equal to the catalytic activity of the fresh catalyst.

Table 6

| Catalyst | | $A_2$ | $E_3$-5 | $E_3$-7 |
|---|---|---|---|---|
| Amount of catalyst | Start | 92 | 95 | 102 |
| required for | 600 hours | 164 | 171 | 183 |
| reaction (ml) | 1200 hours | 221 | 232 | 250 |

EXAMPLE 12

The reactivated catalysts obtained in Example 4 (Catalyst $E_3$-13) and in Example 6 were each reused for steam re-forming under the same conditions as shown in Example 3. The results are shown in Table 7, from which it is seen that the reactivated catalysts show the similar behavior to the fresh catalyst (Catalyst $A_2$) in depression of the catalytic activity and their catalytic activity, particularly that of the reactivated catalyst obtained in Example 6 is nearly equal to the catalytic activity of the fresh catalyst.

Table 7

| Catalyst | | $A_2$ | $E_3$-13 | Obtained in Example 6 |
|---|---|---|---|---|
| Amount of catalyst | Start | 92 | 100 | 93 |
| required for | 600 hours | 164 | 179 | 166 |
| reaction (ml) | 1200 hours | 221 | 242 | 224 |

EXAMPLE 13

The reactivated catalysts obtained in Example 8 (Catalyst $E_5$-8) and in Example 9 were each reused for steam-reforming under the same conditions as shown in Example 7. The results are shown in Table 8, from which it is seen that the reactivated catalysts show the similar behavior to the fresh catalyst (Catalyst $A_4$) in depression of the catalytic activity.

Table 8

| Catalyst | | $A_4$ | $E_5$-8 | Obtained in Example 9 |
|---|---|---|---|---|
| Amount of catalyst | Start | 91 | 95 | 92 |
| required for | 200 hours | 156 | 167 | 159 |
| reaction (ml) | 400 hours | 222 | 238 | 226 |

EXAMPLE 14

The reactivated catalysts obtained in Example 8 (Catalyst $E_5$-16) and in Example 10 were each reused for steam-reforming under the same conditions as shown in Example 7. The results are shown in Table 9, from which it is seen that the reactivated catalysts show the similar behavior to the fresh catalyst (Catalyst $A_4$) in depression of the catalytic activity.

Table 9

| Catalyst | | $A_4$ | $E_5$-16 | Obtained in Example 10 |
|---|---|---|---|---|
| Amount of catalyst | Start | 91 | 96 | 92 |
| required for | 200 hours | 156 | 166 | 160 |
| reaction (ml) | 400 hours | 222 | 235 | 229 |

EXAMPLE 15

A catalyst comprising 2.0% of ruthenium and 0.1% of chromium oxide deposited on spheroidal particles of alumina of 4 mm in diameter as a carrier material (hereinafter referred to as "Catalyst $A_{10}$") (325 ml) was charged into a tubular reactor of 1 inch in diameter, and a gaseous mixture comprising naphtha (content of sulfur, 2 ppm; final boiling point, 168° C.), steam, hydrogen, methane and carbon oxides was fed therein to effect continuously steam-reforming reaction for 1500 hours under the following conditions:

Temperature of reactor: inlet, 450° C., outlet, 524° C.;
Space velocity: 2000 (1/hr);

Ratio of steam/hydrocarbon: 0.9 (number of oxygen atoms per one carbon atom in the feeding gaseous mixture);
Pressure: 13 atm. (absolute)

of treatment with an inorganic alkaline substance, elimination of sulfurous materials and recovery of the dispersibility (as well as recovery of the catalytic activity) are good.

Table 10

| Catalyst | | $A_{10}$ | $B_{10}$ | $C_{10}$-1 | $C_{10}$-2 | $C_{10}$-3 | $C_{10}$-4 | $C_{10}$-5 | $D_{10}$-1 | $D_{10}$-2 | $D_{10}$-3 | $D_{10}$-4 | $D_{10}$-5 |
|---|---|---|---|---|---|---|---|---|---|---|---|---|---|
| Conditions of treatment for reactivation | Reactivating agent* | — | — | $H_2$ | $H_2:H_2O$ (=1:1 by mol) | $H_2O:N_2$ (=3:1 by mol) | $O_2:N_2$ (=21:79 by volume) | $O_2:H_2O:N_2$ (=10:50:40 by volume) | 0.375N NaOH | 0.375N $Na_2CO_3$ | 0.375N $Ba(OH)_2$ | 0.375N NaOH | 0.375N NaOH |
| | Temperature (°C.) | — | — | 600 | 600 | 650 | 500 | 600 | 100 | 100 | 100 | 50 | 30 |
| | Pressure (ata) | — | — | 6.0 | 6.0 | 6.0 | 6.0 | 6.0 | 1.0 | 1.0 | 1.0 | 1.0 | 1.0 |
| | Time (hrs) | — | — | 6.0 | 6.0 | 12.0 | 5.0 | 10.0 | 1.5 | 3.0 | 3.0 | 6.0 | 10.0 |
| | Post-treatment | — | — | — | — | — | — | — | Water washing: 100° C., 2 hrs. Drying: 100° C., 16 hrs. | | | Water washing: 100° C., hrs. Drying: 100° C., 16 hrs. | |
| Elimination percentage of poisonous materials (%) | Carbonaceous materials | — | — | 78 | 80 | 100 | 100 | 100 | 55 | 54 | 50 | 41 | 40 |
| | Sulfurous materials | — | — | 21 | 28 | 32 | 40 | 38 | 95 | 93 | 87 | 78 | 75 |
| Specific surface area ($m^2$/g-Ru) | | 43 | 20 | 19 | 19 | 19 | 17 | 18 | 35 | 36 | 33 | 28 | 28 |
| Amount of catalyst required for reaction (ml) | | 52.5 | — | — | — | — | — | — | 63 | 64 | 66 | 85 | — |

Note:
*In case of Catalysts $C_{10}$-1 to $C_{10}$-5, the treatment was carried out with a space velocity of 2500 (1hr).

After 1500 hours, the resultant catalyst (hereinafter referred to as "Catalyst $B_{10}$") was treated under the conditions as shown in Table 10 for reactivation. The reactivated catalyst was reused in steam-reforming reaction under the same conditions as mentioned above. The results are shown in Table 10.

As seen from Table 10, the reactivation treatment with gaseous materials is effective for elimination of carbonaceous materials, but removal of sulfurous materials is insufficient and the dispersibility can be hardly recovered so that recovery of the catalytic activity is scarcely observed (Catalysts $C_{10}$-1 to $C_{10}$-5). In the case

EXAMPLE 16

The reactivated catalysts as obtained in Example 15 (Catalysts $C_{10}$-1, $C_{10}$-2 and $C_{10}$-5) were each subjected to further treatment for reactivation under the conditions as shown in Table 11. The thus reactivated catalysts were each reused for continuous steam-reforming under the same conditions as shown in Example 15. The results are shown in Table 11.

As seen from Table 11, the catalysts ($E_{11}$-1 to $E_{11}$-6) reactivated in two steps are much recovered in catalytic activity.

Table 11

| Catalyst | | $E_{11}$-1 | $E_{11}$-2 | $E_{11}$-3 | $E_{11}$4 | $E_{11}$5 | $E_{11}$-6 | $E_{11}$-7 | $E_{11}$8 |
|---|---|---|---|---|---|---|---|---|---|
| Catalyst used | | $C_{10}$-1 | $C_{10}$-1 | $C_{10}$-1 | $C_{10}$-1 | $C_{10}$-2 | $C_{10}$-5 | $C_{10}$-1 | $C_{10}$-1 |
| Conditions of treatment for reactivation | Reactivating agent | 0.375N NaOH | 0.375N NaOH | 0.375N $Na_2CO_3$ | 0.375N $Ba(OH)_2$ | 0.1N NaOH | 0.375N NaOH | 0.375N NaOH | 0.375N NaOH |
| | Temperature (°C.) | 50 | 80 | 100 | 100 | 100 | 80 | 30 | 30 |
| | Pressure (ata) | 1.0 | 1.0 | 1.0 | 1.0 | 1.0 | 1.0 | 1.0 | 1.0 |
| | Time (hrs) | 3.0 | 1.5 | 1.5 | 2.0 | 1.5 | 1.5 | 10.0 | 3.0 |
| | Post-treatment | Water washing: 100° C., 2 hrs. Drying: 100° C., 16 hrs. | | | | | | | |
| Elimination percentage of poisonous materials (%) | Carbonaceous materials | 81 | 86 | 85 | 83 | 83 | 100 | 80 | 80 |
| | Sulfurous materials | 83 | 96 | 94 | 88 | 90 | 97 | 80 | 48 |
| Specific surface area ($m^2$/g-Ru) | | 31 | 38 | 37 | 35 | 37 | 38 | 28 | 23 |
| Amount of catalyst required for reac- | | 78 | 58 | 61 | 63 | 61 | 58 | — | — |

Table 11-continued

| Catalyst | $E_{11}$-1 | $E_{11}$-2 | $E_{11}$-3 | $E_{11}$4 | $E_{11}$5 | $E_{11}$-6 | $E_{11}$-7 | $E_{11}$8 |
|---|---|---|---|---|---|---|---|---|
| Catalyst used | $C_{10}$-1 | $C_{10}$-1 | $C_{10}$-1 | $C_{10}$-1 | $C_{10}$-2 | $C_{10}$-5 | $C_{10}$-1 | $C_{10}$-1 |
| tion (ml) | | | | | | | | |

EXAMPLE 17

The reactivated catalysts as obtained in Example 16 (Catalysts $E_{11}$-1, $E_{11}$-7 and $E_{11}$-7 and $E_{11}$-8) were each subjected to further treatment for reactivation under the conditions as shown in Table 12. The thus reactivated catalysts were each reused for continuous steam-reforming under the same conditions as shown in Example 15. The results are shown in Table 12.

As seen from Table 12, the catalysts ($F_{12}$-1 to $F_{12}$-11) reactivated in three steps are much recovered in catalytic activity.

EXAMPLE 19

A catalyst comprising 2.6% of ruthenium and 0.1% of chromium oxide deposited on spheroidal particles of alumina of 4 mm in diameter as a carrier material (hereinafter referred to as "Catalyst $A_{14}$") (325 ml) was charged into a tubular reactor of 1 inch in diameter, and a gaseous mixture comprising naphtha (content of sulfur, 2 ppm; final boiling point, 168° C.), steam, hydrogen, methane and carbon oxides was fed therein to effect continuously steam-reforming reaction for 2400 hours under the following conditions:

Table 12

| Catalyst | | $F_{12}$-1 | $F_{12}$-2 | $F_{12}$-3 | $F_{12}$-4 | $F_{12}$-5 | $F_{12}$-6 | $F_{12}$-7 | $F_{12}$-8 | $F_{12}$-9 | $F_{12}$-10 | $F_{12}$-11 |
|---|---|---|---|---|---|---|---|---|---|---|---|---|
| Catalyst used | | $E_{11}$-1 | $E_{11}$-1 | $E_{11}$-1 | $E_{11}$-1 | $E_{11}$-1 | $E_{11}$-7 | $E_{11}$-7 | $E_{11}$-7 | $E_{11}$-7 | $E_{11}$-7 | $E_{11}$-8 |
| Conditions of treatment for reactivation | Reactivating agent | 0.4% Hydrazine | 0.5% Formaldehyde | 0.3% Sodium borohydride | 0.3% Lithium aluminum hydride | 0.3% Glucose | 0.4% Hydrazine | 0.5% Formaldehyde | 0.3% Sodium borohydride | 0.7% Sodium tartrate | 2.0% Sodium formate | 1.0% Hydrazine |
| | Temperature (°C.) | 20 | 20 | 20 | 20 | 20 | 20 | 20 | 20 | 20 | 20 | 60 |
| | Pressure (ata) | 1.0 | 1.0 | 1.0 | 1.0 | 1.0 | 1.0 | 1.0 | 1.0 | 1.0 | 1.0 | 1.0 |
| | Time (hrs) | 3.0 | 3.0 | 3.0 | 3.0 | 3.0 | 3.0 | 3.0 | 3.0 | 3.0 | 3.0 | 3.0 |
| | Post-treatment | Water washing: 75° C., 3 hrs. Drying: 100° C., 16 hrs. | | | | | | | | | | |
| Elimination percentage of poisonous materials (%) | Carbonaceous materials | 81 | 81 | 81 | 81 | 81 | 80 | 80 | 80 | 80 | 80 | 80 |
| | Sulfurous materials | 96 | 90 | 95 | 92 | 92 | 92 | 87 | 90 | 91 | 93 | 94 |
| Specific surface area (m²/g-Ru) | | 41 | 40 | 40 | 40 | 40 | 37 | 36 | 35 | 36 | 36 | 39 |
| Amount of catalyst required for reaction (ml) | | 53 | 55 | 56 | 53 | 56 | 60 | 61 | 63 | 61 | 61 | 56 |

EXAMPLE 18

The reactivated catalysts obtained in Example 16 (Catalyst $E_{11}$-2) and in Example 17 (Catalyst $F_{12}$-1) were each reused for steam-reforming under the same conditions as shown in Example 15. The results are shown in Table 13, from which it is seen that the reactivated catalysts show the similar behavior to the fresh catalyst (Catalyst $A_{10}$) in depression of the catalytic activity and their catalytic activity, particularly that of Catalyst $F_{12}$-1 is nearly equal to the catalytic activity of the fresh catalyst.

Table 13

| Catalyst | | $A_{10}$ | $E_{11}$-2 | $F_{12}$-1 |
|---|---|---|---|---|
| Amount of catalyst required for reaction (ml) | Start | 52.5 | 58 | 53 |
| | 300 hours | 123.5 | 139.5 | 125 |
| | 600 hours | 183 | 208.5 | 186 |
| | 900 hours | 252 | 289 | 257 |

Temperature of reaction: inlet, 400° C., outlet 517° C;
Space velocity: 1500 (1/hr);
Ratio of steam/hydrocarbon: 0.7 (number of oxygen atoms per one carbon atom in the feeding gaseous mixture);
Pressure: 13 atm. (absolute)

After 2400 hours, the resultant catalyst (hereinafter referred to as "Catalyst $B_{14}$") was treated under the conditions as shown in Table 14 for reactivation. The reactivated catalyst was reused in steam-reforming reaction under the same conditions as mentioned above. The results are shown in Table 14.

As seen from Table 14, the reactivation treatment with gaseous materials is effective for elimination of carbonaceous materials, but removal of sulfurous materials is insufficient and the dispersibility can be hardly recovered so that recovery of the catalytic activity is scarcely observed (Catalysts $C_{14}$-1 to $C_{14}$-5). In the case of treatment with an inorganic alkaline substance, elimination of sulfurous materials and recovery of the dispersibility (as well as recovery of the catalytic activity) are good.

Table 14

| Catalyst | | A14 | B14 | C14-1 | C14-2 | C14-3 | C14-4 | C14-5 | D14-1 | D14-2 | D14-3 | D14-4 | D14-5 | D14-6 | D14-7 | D14-8 | D14-9 |
|---|---|---|---|---|---|---|---|---|---|---|---|---|---|---|---|---|---|
| Conditions of treatment for reactivation | Reactivating agent* | — | — | $H_2$ | $H_2:H_2O$ (=1:1 by mol) | $H_2O:N_2$ (=3:1 by mol) | $O_2:N_2$ (=21:79 by volume) | $O_2:H_2O:N_2$ (=10:50:40 by volume) | 0.375N NaOH | 0.375N NaOH | 0.375N NaOH | 0.375N NaOH | 0.375N $Na_2CO_3$ | 0.375N $Ba(OH)_2$ | 0.1N NaOH | 0.375N $Na_2CO_3$ | 0.375N $Ba(OH)_2$ |
| | Temperature (°C.) | — | — | 600 | 600 | 650 | 500 | 600 | 30 | 30 | 50 | 100 | 100 | 100 | 100 | 80 | 100 |
| | Pressure (ata) | — | — | 6.0 | 6.0 | 6.0 | 6.0 | 6.0 | 1.0 | 1.0 | 1.0 | 1.0 | 1.0 | 1.0 | 1.0 | 1.0 | 1.0 |
| | Time (hrs) | — | — | 6.0 | 6.0 | 12.0 | 5.0 | 10.0 | 3.0 | 10.0 | 6.0 | 3.0 | 3.0 | 3.0 | 3.0 | 3.0 | 1.5 |
| | Post-treatment | — | — | — | — | — | — | — | Water washing: 100° C., 2 hrs. Drying: 100° C., 16 hrs. | Water washing: 100° C., 16 hrs. Drying: 100° C., | | Water washing: 100° C., 16 hrs. Drying: 100° C., 2 hrs. | | | | | |
| Elimination percentage of | Carbonaceous materials | — | — | 75 | 78 | 30 | 37 | 35 | 12 | 41 | 43 | 52 | 51 | 47 | 40 | 44 | 45 |
| poisonous materials (%) | Sulfurous materials | — | — | 19 | 25 | 19 | 17 | 18 | 32 | 72 | 78 | 90 | 88 | 82 | 75 | 77 | 76 |
| Specific surface area ($m^2$/g-Ru) | | 43 | 20 | 19 | 19 | — | — | — | 21 | 27 | 28 | 34 | 34 | 32 | 30 | 30 | 29 |
| Amount of catalyst required for reaction (ml) | | 92 | — | — | — | — | — | — | — | — | 147 | 110 | 112 | 116 | 120 | 122 | 127 |

Note:
*In case of Catalysts C14-1 to C14-5, the treatment was carried out with a space velocity of $2500^{14}$(1/hr).

EXAMPLE 20

The reactivated catalysts as obtained in Example 19 (Catalysts $D_{14}$-7 to $D_{14}$-9) were each subjected to further treatment for reactivation under the conditions as shown in Table 15. The thus reactivated catalysts were each reused for continuous steam-reforming under the same conditions as shown in Example 19. The results are shown in Table 15.

As seen from Table 15, the catalysts ($E_{15}$-1 to $E_{15}$-5) reactivated in two steps are much recovered in catalytic activity.

Table 15

| Catalyst<br>Catalyst used | | $E_{15}$-1<br>$D_{14}$-7 | $E_{15}$-2<br>$D_{14}$-7 | $E_{15}$-3<br>$D_{14}$-7 | $E_{15}$-4<br>$D_{14}$-8 | $E_{15}$-5<br>$D_{14}$-9 |
|---|---|---|---|---|---|---|
| Conditions of treatment for reactivation | Reactivating agent* | $H_2$ | $H_2:H_2O$<br>( = 1:1<br>by mol) | $O_2:H_2O$<br>$N_2$ ( = 10:<br>50:40 by<br>volume) | $H_2$ | $H_2:H_2O$<br>( = 1:1<br>by mol) |
| | Temperature (°C.) | 600 | 600 | 600 | 650 | 650 |
| | Pressure (ata) | 6.0 | 6.0 | 6.0 | 6.0 | 6.0 |
| | Time (hrs) | 6.0 | 6.0 | 10.0 | 12.0 | 12.0 |
| | Post-treatment | — | — | — | — | — |
| Elimination percentage of poisonous materials (%) | Carbonaceous materials | 85 | 87 | 100 | 100 | 100 |
| | Sulfurous materials | 80 | 81 | 84 | 81 | 82 |
| Specific surface area ($m^2$/g-Ru) | | 31 | 31 | 30 | 30 | 30 |
| Amount of catalyst required for reaction (ml) | | 105 | 105 | 110 | 110 | 112 |

Note:
*In case of Catalysts $E_{15}$-1 to $E_{15}$-5, the treatment was carried out with a space velocity of 2500 (1/hr).

EXAMPLE 21

The reactivated catalysts as obtained in Example 19 (Catalysts $D_{14}$-1 to $D_{14}$-4, $D_{14}$-8 and $D_{14}$-9) were each subjected to further treatment for reactivation under the conditions as shown in Table 16. The thus reactivated catalysts were each reused for continuous steam-reforming under the same conditions as shown in Example 19. The results are shown in Table 16.

As seen from Table 16, the catalysts ($E_{16}$-1 to $E_{16}$-10) reactivated in two steps are much recovered in catalytic activity.

Table 16

| Catalyst<br>Catalyst used | | $E_{16}$-1<br>$D_{14}$-1 | $E_{16}$-2<br>$D_{14}$-2 | $E_{16}$-3<br>$D_{14}$-3 | $E_{16}$-4<br>$D_{14}$-3 | $E_{16}$-5<br>$D_{14}$-3 | $E_{16}$-6<br>$D_{14}$-4 | $E_{16}$-7<br>$D_{14}$-8 | $E_{16}$-8<br>$D_{14}$-8 | $E_{16}$-9<br>$D_{14}$-9 | $E_{16}$-10<br>$D_{14}$-9 |
|---|---|---|---|---|---|---|---|---|---|---|---|
| Conditions of treatment for reactivation | Reactivating agent | 1.0%<br>Hydrazine | 0.4%<br>Hydrazine | 0.3%<br>Lithium aluminum hydride | 0.5%<br>Formaldehyde | 0.3%<br>Sodium borohydride | 0.3%<br>Glucose | 0.5%<br>Formaldehyde | 0.7%<br>Sodium tartrate | 0.4%<br>Hydrazine | 2.0%<br>Sodium formate |
| | Temperature (°C.) | 60 | 20 | 20 | 20 | 20 | 20 | 20 | 20 | 20 | 20 |
| | Pressure (ata) | 1.0 | 1.0 | 1.0 | 1.0 | 1.0 | 1.0 | 1.0 | 1.0 | 1.0 | 1.0 |
| | Time (hrs) | 3.0 | 3.0 | 3.0 | 3.0 | 3.0 | 3.0 | 3.0 | 3.0 | 3.0 | 3.0 |
| | Post-treatment | Water washing: 75° C., 3 hrs. Drying: 100° C., 16 hrs. | | | | | | | | | |
| Elimination percentage of poisonous materials (%) | Carbonaceous materials | 12 | 41 | 43 | 43 | 43 | 52 | 44 | 44 | 45 | 45 |
| | Sulfurous materials | 89 | 91 | 93 | 93 | 93 | 97 | 90 | 88 | 92 | 90 |
| Specific surface area ($m^2$/g-Ru) | | 34 | 36 | 36 | 36 | 34 | 40 | 36 | 36 | 36 | 36 |
| Amount of catalyst required for reaction (ml) | | 108 | 110 | 102 | 106 | 108 | 95 | 106 | 106 | 102 | 102 |

EXAMPLE 22

The reactivated catalysts as obtained in Example 21 (Catalysts $E_{16}$-1, $E_{16}$-3 and $E_{16}$-5 to $E_{16}$-7) were each subjected to further treatment for reactivation under the conditions as shown in Table 17. The thus reactivated catalysts were each reused for continuous steam-reforming under the same conditions as shown in Example 15. The results are shown in Table 17.

As seen from Table 17, the catalysts ($F_{17}$-1 to $F_{17}$-5) reactivated in three steps are much recovered in catalytic activity.

Table 17

| Catalyst<br>Catalyst used | | $F_{17}$-1<br>$E_{16}$-1 | $F_{17}$-2<br>$E_{16}$-3 | $F_{17}$-3<br>$E_{16}$-5 | $F_{17}$-4<br>$E_{16}$-6 | $F_{17}$-5<br>$E_{16}$-7 |
|---|---|---|---|---|---|---|
| Conditions of treatment for reactivation | Reactivating agent* | $H_2$ | $H_2$ | $H_2$:$H_2O$<br>(=1:1<br>by mol) | $H_2O$:$N_2$<br>(=3:1<br>by mol) | $O_2$:$H_2O$:$N_2$<br>(=10:50:40<br>by volume) |
| | Temperature (°C.) | 650 | 600 | 600 | 650 | 600 |
| | Pressure (ata) | 6.0 | 6.0 | 6.0 | 6.0 | 6.0 |
| | Time (hrs) | 12.0 | 6.0 | 6.0 | 12.0 | 10.0 |
| | Post-treatment | — | — | — | — | — |
| Elimination percentage of poisonous materials (%) | Carbonaceous materials | 100 | 86 | 87 | 100 | 100 |
| | Sulfurous materials | 96 | 96 | 96 | 97 | 94 |
| Specific surface area ($m^2$/g-Ru) | | 35 | 37 | 35 | 40 | 37 |
| Amount of catalyst required for reaction (ml) | | 100 | 96 | 102 | 93 | 98 |

Note:
*In case of Catalysts $F_{17}$-1 to $F_{17}$-5, the treatment was carried out with a space velocity of 2500 (1/hr).

EXAMPLE 23

The reactivated catalysts obtained in Example 20 (Catalyst $E_{15}$-1) and in Example 22 (Catalyst $F_{17}$-4) were each reused for steam-reforming under the same conditions as shown in Example 19. The results are shown in Table 18, from which it is seen that the reactivated catalysts show the similar behavior to the fresh catalyst (Catalyst $A_{14}$) in depression of the catalytic activity and their catalytic activity, particularly that of Catalyst $F_{17}$-4, is nearly equal to the catalytic activity of the fresh catalyst.

Table 18

| Catalyst | | $A_{14}$ | $E_{15}$-1 | $F_{17}$-4 |
|---|---|---|---|---|
| Amount of catalyst required for reaction (ml) | Start | 92 | 105 | 93 |
| | 600 hours | 164 | 191 | 168 |
| | 1200 hours | 221 | 260 | 227 |

EXAMPLE 24

A catalyst comprising 2% of ruthenium deposited on spheroidal particles of alumina of 4 mm in diameter (hereinafter referred to as "Catalyst $A_{18}$") (6700 ml) was charged into a tubular reactor of 5 inch in diameter, and methanol and steam were fed therein to effect continuously steam-reforming reaction for 2000 hours under the following conditions:

Temperature of reactor: inlet, 580° C., outlet, 620° C.;
Space velocity: 15800 (1/hr);
Ratio of steam/methanol: 1.5 (by mol);
Pressure: 6 atm. (absolute)

After 2000 hours, the catalyst (hereinafter referred to as "Catalyst $B_{18}$") was treated under the same conditions as shown in Table 18 for reactivation. The reactivated catalyst was reused in steam-reforming reaction under the same conditions as mentioned above. The results are shown in Table 18.

As seen from Table 18, treatment with an inorganic alkaline substance or a reducing substance shows recovery of the catalytic activity.

Table 18

| Catalyst | | $A_{18}$ | $B_{18}$ | Reactivated | | | |
|---|---|---|---|---|---|---|---|
| | | | | $D_{18}$-1 | $D_{18}$-2 | $D_{18}$-3 | $D_{18}$-4 |
| Conditions of treatment for reactivation | Reactivating agent | — | — | 0.375N NaOH | 0.375N NaOH | 1.0% Hydrazine | 0.3% Glucose |
| | Temperature (°C.) | — | — | 30 | 100 | 60 | 20 |
| | Pressure (ata) | — | — | 1.0 | 1.0 | 1.0 | 1.0 |
| | Time (hrs) | — | — | 3.0 | 3.0 | 3.0 | 3.0 |
| | Post-treatment | — | — | Water washing: 100° C., 2 hrs. Drying: 100° C., 16 hrs. | | Water washing: 75° C., 3 hrs. Drying: 100° C., 16 hrs. | |
| Elimination per- | Carbonaceous | — | — | 12 | 53 | 0 | 0 |

Table 18-continued

| Catalyst | | $A_{18}$ | $B_{18}$ | Reactivated | | | |
|---|---|---|---|---|---|---|---|
| | | | | $D_{18}$-1 | $D_{18}$-2 | $D_{18}$-3 | $D_{18}$-4 |
| centage of poisonous materials (%) | materials Sulfurous materials | — | — | — | — | — | — |
| Specific surface area ($m^2$/g-Ru) | | 43 | 17 | 20 | 34 | 23 | 23 |
| Amount of catalyst required for reaction (1) | | 1.3 | — | — | 1.6 | 3.8 | 4.0 |

EXAMPLE 25

The reactivated catalysts as obtained in Example 24 (Catalysts $D_{18}$-1 to $D_{18}$-4) were each subjected to further treatment for reactivation under the conditions as shown in Table 19. The thus reactivated catalysts were each reused for continuous steam-reforming under the same conditions as shown in Example 24. The results are shown in Table 19.

As seen from Table 19, the catalysts ($E_{19}$-1 to $E_{19}$-4) reactivated in two steps are much more recovered in catalytic activity than the catalysts ($D_{18}$-1 to $D_{18}$-4) reactivated in one step.

Table 19

| Catalyst<br>Catalyst used | | $E_{19}$-1<br>$D_{18}$-1 | $E_{19}$-2<br>$D_{18}$-2 | $E_{19}$-3<br>$D_{18}$-3 | $E_{19}$-4<br>$D_{18}$-4 |
|---|---|---|---|---|---|
| Conditions of treatment for reactivation | Reactivating agent | 1.0% Hydrazine | 0.3% Sodium borohydride | 0.375N NaOH | 0.375N NaOH |
| | Temperature (°C.) | 60 | 20 | 100 | 80 |
| | Pressure (ata) | 1.0 | 1.0 | 1.0 | 1.0 |
| | Time (hrs) | 3.0 | 3.0 | 3.0 | 3.0 |
| | Post-treatment | Water washing: 75° C., 3 hrs. Drying: 100° C., 16 hrs. | | Water washing: 100° C., 2 hrs. Drying: 100° C., 16 hrs. | |
| Elimination percentage of poisonous | Carbonaceous materials | 12 | 52 | 52 | 50 |
| | Sulfurous materials (%) | — | — | — | — |
| Specific surface area ($m^2$/g-Ru) | | 34 | 40 | 41 | 38 |
| Amount of catalyst required for reaction (1) | | 1.5 | 1.4 | 1.3 | 1.4 |

EXAMPLE 26

A catalyst comprising 2.0% of ruthenium deposited on spheroidal particles of alumina of 4 mm in diameter as a carrier material (hereinafter referred to as "Catalyst $A_{20}$") (290 ml) was charged into a tubular reactor of 1 inch in diameter, and methane (content of sulfur, 2 ppm) and air were fed therein to effect continuously partial oxidation for 2500 hours under the following conditions:

Temperature of reactor: inlet, 310° C., outlet, 700° C.;
Space velocity: 17500 (1/hr);
Ratio of air/methane: 2.37 (by mol);
Pressure: 1 atm. (absolute)

After 2500 hours, the resultant catalyst (hereinafter referred to as "Catalyst $B_{20}$") was treated under the conditions as shown in Table 20 for reactivation. The reactivated catalyst was reused in partial oxidation under the same conditions as mentioned above. The results are shown in Table 20.

As seen from Table 20, treatment with an inorganic alkaline substance or a reducing substance shows recovery of the catalytic activity.

Table 20

| Catalyst | | $A_{20}$ | $B_{20}$ | Reactivated | | | |
|---|---|---|---|---|---|---|---|
| | | | | $D_{20}$-1 | $D_{20}$-2 | $D_{20}$-3 | $D_{20}$-4 |
| Conditions of treatment for reactivation | Reactivating agent | — | — | 0.375N NaOH | 0.375N NaOH | 1.0% Formaldehyde | 2.0% Sodium formate |
| | Temperature (°C.) | — | — | 30 | 100 | 60 | 20 |
| | Pressure (ata) | — | — | 1.0 | 1.0 | 1.0 | 1.0 |
| | Time (hrs) | — | — | 3.0 | 3.0 | 3.0 | 3.0 |
| | Post-treatment | — | — | Water washing: 100° C., 2 hrs. Drying: 100° C., 16 hrs. | | Water washing: 75° C., 3 hrs. Drying: 100° C., 16 hrs. | |
| Elimination percentage of poisonous materials (%) | Carbonaceous materials | — | — | 12 | 52 | 0 | 0 |
| | Sulfurous materials | — | — | 32 | 95 | 70 | 55 |

Table 20-continued

| Catalyst | $A_{20}$ | $B_{20}$ | Reactivated $D_{20}$-1 | $D_{20}$-2 | $D_{20}$-3 | $D_{20}$-4 |
|---|---|---|---|---|---|---|
| Specific surface area ($m^2$/g-Ru) | 43 | 17 | 21 | 33 | 21 | 21 |
| Amount of catalyst required for reaction (ml) | 58 | — | — | 67 | 170 | 172 |

EXAMPLE 27

The reactivated catalysts as obtained in Example 26 (Catalysts $D_{20}$-1 to $D_{20}$-4) were each subjected to further treatment for reactivation under the conditions as shown in Table 21. The thus reactivated catalysts were each reused for continuous partial oxidation under the same conditions as shown in Example 26. The results are shown in Table 21.

As seen from Table 21, the catalysts ($E_{21}$-1 to $E_{21}$-4) reactivated in two steps are much more recovered in catalytic activity than the catalysts ($D_{20}$-1 to $D_{20}$-4) reactivated in one step.

Table 21

| Catalyst<br>Catalyst used | | $E_{21}$-1<br>$D_{20}$-1 | $E_{21}$-2<br>$D_{20}$-1 | $E_{21}$-3<br>$D_{20}$-3 | $E_{21}$-4<br>$D_{20}$-4 |
|---|---|---|---|---|---|
| Conditions of treatment for reactivation | Reactivating agent | 1.0% Hydrazine | 0.3% Sodium borohydride | 0.375N NaOH | 0.375N NaOH |
| | Temperature (°C.) | 60 | 20 | 80 | 80 |
| | Pressure (ata) | 1.0 | 1.0 | 1.0 | 1.0 |
| | Time (hrs) | 3.0 | 3.0 | 3.0 | 3.0 |
| | Post-treatment | Water washing: 75° C., 3 hrs. Drying: 100° C., 16 hrs. | Water washing: 75° C., 3 hrs. Drying: 100° C., 16 hrs. | Water washing: 100° C., 2 hrs. Drying: 100° C., 16 hrs. | Water washing: 100° C., 2 hrs. Drying: 100° C., 16 hrs. |
| Elimination percentage of poisonous materials (%) | Carbonaceous materials | 12 | 52 | 47 | 47 |
| | Sulfurous materials | 95 | 97 | 92 | 93 |
| Specific surface area ($m^2$/g-Ru) | | 34 | 40 | 39 | 37 |
| Amount of catalyst required for reaction (ml) | | 68 | 62 | 60 | 62 |

EXAMPLE 28

A catalyst comprising 1.0% of ruthenium and 0.1% of chromium oxide deposited on spheoidal particles of alumina of 4 mm in diameter as a carrier material (hereinafter referred to as "Catalyst $A_{23}$") (400 ml) was charged into a tubular reactor of 1 inch in diameter, and a gaseous mixture comprising naphtha (content of sulfur, 2 ppm; final boiling point, 108° C.) and hydrogen was fed therein to effect continuously hydro-cracking for 700 hours under the conditions as shown in Table 22:

Table 22

| Temperature of reactor at inlet | 265° C. |
|---|---|

Table 22-continued

| Pressure | 46 atm. (absolute) |
|---|---|
| Ratio of hydrogen/hydrocarbon | 1.20 (by mol) |
| Mass velocity | 500 kg-mol/$m^2$.hr |

After 700 hours, the resultant catalyst (hereinafter referred to as "Catalyst $B_{23}$") was treated under the conditions as shown in Table 23 for reactivation. The reactivated catalyst was reused in hydro-cracking under the same conditions as mentioned above. The results are shown in Table 23.

As seen from Table 23, the reactivation treatment with hydrogen is extremely effective for elimination of carbonaceous materials, but removal of sulfurous materials is insufficient and the dispersibility can be hardly recovered so that recovery of the catalytic activity is scarcely observed (Catalyst $C_{23}$). In the case of treatment with an inorganic alkaline substance at room temperature for a long time, elimination of sulfurous materials and recovery of the dispersibility are good, but recovery of the catalytic activity is still not good (Catalysts $D_{23}$-1 and $D_{23}$-2). When treated with an inorganic alkaline substance under heating, recovery of the catalytic activity is good (Catalysts $D_{23}$-3, $D_{23}$-4, $D_{23}$-5, $D_{23}$-14, $D_{23}$-15, $D_{23}$-16). On the other hand, sole treatment with an aqueous solution of hydrazine is effective in removal of sulfurous materials but almost ineffective in removal of carbonaceous materials. Nevertheless, a tendency to recovery of the catalytic activity is seen (Catalysts $D_{23}$-6 to $D_{23}$-13).

Table 23

| Catalyst | | A₂₃ | B₂₃ | C₂₃ | Reactivated | | | | | | | | | | | | | |
|---|---|---|---|---|---|---|---|---|---|---|---|---|---|---|---|---|---|---|
| | | | | | D₂₃-1 | D₂₃-2 | D₂₃-3 | D₂₃-4 | D₂₃-5 | D₂₃-6 | D₂₃-7 | D₂₃-8 | D₂₃-9 | D₂₃-10 | D₂₃-11 | D₂₃-12 | D₂₃-13 | D₂₃-14 | D₂₃-15 | D₂₃-16 |
| Conditions for reactivation | Reactivating agent* | — | — | H₂ | 0.375N NaOH | 0.375N NaOH | 0.375N NaOH | 0.375N NaOH | 0.375N NaOH | 0.4% Hydrazine | 0.3% Lithium aluminum hydride | 0.7% Sodium tartrate | 2.0% Sodium formate | 0.3% Glucose | 1.0% Hydrazine | 1.0% Formaldehyde | 1.0% Sodium borohydride | 5.0N NaOH | 0.375N Na₂CO₃ | 0.375N Ba(OH)₂ |
| | Temperature (°C.) | — | — | 650 | 30 | 30 | 50 | 100 | 148 | 20 | 20 | 20 | 20 | 20 | 60 | 60 | 60 | 100 | 100 | 100 |
| | Pressure (ata) | — | — | 6.0 | 1.0 | 1.0 | 1.0 | 1.0 | 5.0 | 1.0 | 1.0 | 1.0 | 1.0 | 1.0 | 1.0 | 1.0 | 1.0 | 1.0 | 1.0 | 1.0 |
| | Time (hrs) | — | — | 12.0 | 3.0 | 10.0 | 6.0 | 3.0 | 1.0 | 3.0 | 3.0 | 3.0 | 3.0 | 3.0 | 3.0 | 3.0 | 3.0 | 3.0 | 3.0 | 3.0 |
| | Post-treatment | — | — | — | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. | | Water washing: 75° C., 3 hrs. Drying: 100° C., 16 hrs. | Water washing: 75° C., 3 hrs. Drying: 100° C., 16 hrs. | | | Water washing: 100° C., 2 hrs. Drying: 100° C., 16 hrs. | Water washing: 75° C., 3 hrs. Drying: 100° C., 16 hrs. | | | Water washing: 100° C., 2 hrs. Drying: 100° C., 16 hrs. | | |
| Elimination percentage of poisonous materials (%) | Carbonaceous materials | — | — | 100 | 10 | 30 | 35 | 47 | 50 | 0 | 0 | 0 | 0 | 0 | 0 | 0 | 0 | 50 | 43 | 40 |
| | Sulfurous materials | — | — | 20 | 40 | 73 | 79 | 90 | 100 | 70 | 51 | 51 | 54 | 51 | 91 | 69 | 88 | 95 | 86 | 82 |
| Specific surface area (m²/g-Ru) | | 43 | 25 | 25 | 27 | 28 | 31 | 36 | 36 | 28 | 29 | 29 | 29 | 29 | 29 | 29 | 29 | 38 | 36 | 32 |
| Conversion of hydrogen (%) | | 88 | 5 | 5 | 7 | 8 | 50 | 68 | 69 | 40 | 39 | 39 | 39 | 38 | 45 | 39 | 38 | 70 | 68 | 65 |

EXAMPLE 29

The reactivated catalysts as obtained in Example 28 (Catalysts $D_{23}$-1 to $D_{23}$-12) were each subjected to further treatment for reactivation under the conditions as shown in Table 24. The thus reactivated catalysts were each reused for continuous hydro-cracking under the same conditions as shown in Example 28. The results are shown in Table 24.

As seen from Table 24, the catalyst ($E_{24}$-1 to $E_{24}$-20) reactivated in two steps are much more recovered in catalytic activity than the catalysts ($D_{23}$-1 to $D_{23}$-12) reactivated in one step.

Table 24

| Catalyst used | E24-1 D23-1 | E24-2 D23-2 | E24-3 D23-3 | E24-4 D23-3 | E24-5 D23-4 | E24-6 D23-4 | E24-7 D23-6 | E24-8 D23-6 | E24-9 D23-11 | E24-10 D23-12 | E24-11 D23-1 | E24-12 D23-2 | E24-13 D23-3 | E24-14 D23-3 | E24-15 D23-4 | E24-16 D23-4 | E24-17 D23-7 | E24-18 D23-8 | E24-19 D23-9 | E24-20 D23-10 |
|---|---|---|---|---|---|---|---|---|---|---|---|---|---|---|---|---|---|---|---|---|
| Reactivating agent | 1.0% Hydrazine | 0.4% Hydrazine | 0.4% Hydrazine | 0.5% Formaldehyde | 0.4% Hydrazine | 0.3% Sodium borohydride | 0.375N NaOH | 0.375N NaOH | 0.375N NaOH | 0.375N NaOH | 0.3% Lithium aluminum hydride | 0.3% Lithium aluminum hydride | 0.7% Sodium tartrate | 2.0% Sodium formate | 0.3% Lithium aluminum hydride | 0.3% Glucose | 0.375N NaOH | 0.1N NaOH | 0.375N NaOH | 0.375 NaOH |
| Conditions of treatment for reactivation — Temperature (°C.) | 60 | 20 | 20 | 20 | 20 | 20 | 50 | 100 | 100 | 100 | 20 | 20 | 20 | 20 | 20 | 20 | 50 | 100 | 100 | 80 |
| Pressure (ata) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Time (hrs) | 3.0 | 3.0 | 3.0 | 3.0 | 3.0 | 3.0 | 6.0 | 3.0 | 3.0 | 3.0 | 3.0 | 3.0 | 3.0 | 3.0 | 3.0 | 3.0 | 6.0 | 3.0 | 1.5 | 3.0 |
| Post-treatment | Water washing: 100° C., 16 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | | | | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. | | Water washing: 75° C., 3 hrs. Drying: 100° C., 16 hrs. | Water washing: 75° C., 3 hrs. Drying: 100° C., 16 hrs. | | | | | Water washing: 100° C., 2 hrs. Drying: 100° C., 16 hrs. | | Water washing: 100° C., 2 hrs. Drying: 100° C., 16 hrs. | |
| Elimination percentage of poisonous materials (%) — Carbonaceous materials | 10 | 30 | 35 | 35 | 47 | 47 | 35 | 49 | 48 | 39 | 10 | 30 | 35 | 35 | 47 | 47 | 35 | 36 | 38 | 39 |
| Sulfurous materials | 91 | 93 | 95 | 95 | 98 | 97 | 93 | 98 | 97 | 91 | 68 | 88 | 91 | 92 | 97 | 97 | 91 | 90 | 95 | 94 |
| Specific surface area (m²/g-Ru) | 36 | 38 | 38 | 38 | 40 | 40 | 37 | 40 | 42 | 40 | 36 | 38 | 39 | 39 | 42 | 41 | 39 | 39 | 39 | 39 |
| Conversion of hydrogen (%) | 48 | 51 | 74 | 70 | 80 | 77 | 74 | 80 | 81 | 80 | 50 | 50 | 74 | 74 | 81 | 80 | 77 | 74 | 74 | 74 |

EXAMPLE 30

The reactivated catalyst obtained in Example 28 (Catalyst $D_{23}$-3) was treated with a 0.4% aqueous solution of hydrazine at 20° C. under 1 atm. (absolute) for 3 hours, washed with water at 75° C. for 3 hours and dried at 100° C. for 16 hours. Then, the resulting catalyst was again subjected to treatment with a 0.375 N aqueous solution of sodium hydroxide at 50° C. under 1 atm. (absolute) for 6 hours and treatment with a 0.4% aqueous solution of hydrazine at 20° C. under 1 atm. (absolute) for 3 hours, followed by washing with water at 75° C. for 3 hours and drying at 100° C. for 16 hours. The thus reactivated catalyst was used for hydro-cracking under the same conditions as shown in Table 22. The results are shown in Table 25.

Table 25

| Catalyst | | F |
|---|---|---|
| Elimination percentage of poisonous materials (%) | Carbonaceous materials | 70 |
| | Sulfurous materials | 100 |
| Specific surface area ($m^2$/g-Ru) | | 42 |
| Conversion of hydrogen (%) | | 81 |

As seen from the above results, the repeating treatments with an inorganic alkaline substance and with a reducing substance are quite effective for reactivation of the catalyst.

EXAMPLE 31

The reactivated catalysts obtained in Example 29 (Catalysts $E_{24}$-5 and $E_{24}$-7) were used for continuous hydro-cracking under the conditions as shown in Example 28. The reactivated catalysts showed a similar tendency to a freshly prepared catalyst (Catalyst $A_{23}$) in depression of the catalytic activity.

EXAMPLE 32

A catalyst comprising 0.3% of ruthenium and 0.1% of chromium oxide deposited on spheroidal particles of alumina of 4 mm in diameter as a carrier material (hereinafter referred to as "Catalyst $A_{28}$") (1000 ml) was charged into a tubular reactor of 1 inch in diameter, and naphtha (content of sulfur, 2 ppm; final boiling point, 108° C.) and hydrogen were fed therein to effect continuously hydro-cracking reaction under the conditions as shown in Table 27.

Table 27

| Temperature of reactor at inlet | 265° C. |
|---|---|
| Pressure | 46 atm. (absolute) |
| Ratio of hydrogen/hydrocarbon | 1.20 (by mol) |
| Mass velocity | 500 kg-mol/$m^2$ . hr |

After 200 hours, the resultant catalyst (hereinafter referred to as "Catalyst $B_{28}$") was treated under the conditions as shown in Table 28 for reactivation. The reactivated catalyst was reused in hydro-cracking reaction under the same conditions as mentioned above. The results are shown in Table 28.

As seen from Table 28, the reactivation treatment with gaseous materials such as hydrogen, hydrogen-steam, oxygen-nitrogen and oxygen-nitrogen-steam is extremely effective for elimination of carbonaceous materials, but removal of sulfurous materials is not achieved and the dispersibility can be hardly recovered so that recovery of the catalytic activity is not observed (Catalysts $C_{28}$-1 to $C_{28}$-5). In the case of treatment with an inorganic alkaline substance at room temperature, elimination of sulfurous materials is accomplished, but no catalytic activity is recognized (Catalyst $D_{28}$-5). When treated with an inorganic alkaline substance under heating, elimination of sulfurous materials and recovery of the dispersibility as well as recovery of the catalytic activity are good (Catalysts $D_{28}$-1 to $D_{28}$-4).

Table 28

| Catalyst | | $A_{28}$ | $B_{28}$ | Reactivated | | | | | | | | | |
|---|---|---|---|---|---|---|---|---|---|---|---|---|---|
| | | | | $C_{28}$-1 | $C_{28}$-2 | $C_{28}$-3 | $C_{28}$-4 | $C_{28}$-5 | $D_{28}$-1 | $D_{28}$-2 | $D_{28}$-3 | $D_{28}$-4 | $D_{28}$-5 |
| Conditions of treatment for reactivation | Reactivating agent* | — | — | $H_2$ | $H_2$:$H_2O$ (1:1 by mol) | $H_2O$:$N_2$ (3:1 by mol) | $O_2$:$N_2$ (21:79 by volume) | $O_2$:$H_2O$: $N_2$(10:50:40 by volume) | 0.375N NaOH | 0.375N $Na_2CO_3$ | o.375N $Ba(OH)_2$ | 0.375N NaOH | 0.375N NaOH |
| | Temperature (°C.) | — | — | 600 | 600 | 650 | 500 | 600 | 100 | 100 | 100 | 50 | 30 |
| | Pressure (ata) | — | — | 6.0 | 6.0 | 6.0 | 6.0 | 6.0 | 1.0 | 1.0 | 1.0 | 1.0 | 1.0 |
| | Time (hrs) | — | — | 6.0 | 6.0 | 12.0 | 5.0 | 10.0 | 1.5 | 3.0 | 3.0 | 6.0 | 10.0 |
| | Post-treatment | — | — | — | — | — | — | — | Water washing: 100° C., 2 hrs. Drying: 100° C., 16 hrs. | | | | |
| Elimination percentage of poisonous materials (%) | Carbonaceous materials | — | — | 76 | 78 | 100 | 100 | 100 | 44 | 43 | 40 | 35 | 30 |
| | Sulfurous materials | — | — | 28 | 31 | 34 | 42 | 40 | 88 | 86 | 82 | 79 | 73 |
| Specific surface area ($m^2$/g-Ru) | | 43 | 25 | 25 | 25 | 25 | 23 | 24 | 34 | 36 | 32 | 31 | 28 |
| Conversion of hydrogen (%) | | 89 | 5 | 5 | 5 | 6 | 5 | 6 | 68 | 68 | 65 | 50 | 8 |

EXAMPLE 33

The reactivated catalysts as obtained in Example 32 (Catalysts $C_{28}$-1, $C_{28}$-2 and $C_{28}$-5) were each subjected to further treatment for reactivation under the conditions as shown in Table 29. The thus reactivated catalysts were each reused for continuous hydro-cracking under the same conditions as shown in Table 27. The results are shown in Table 29 (Catalysts $E_{29}$-1 to $E_{29}$-8).

Likewise, the reactivated catalysts as obtained in Example 32 (Catalysts $D_{28}$-1 and $D_{28}$-2) were each subjected to further treatment for reactivation under the conditions as shown in Table 29. The thus reactivated catalysts were each reused for continuous hydro-cracking under the same conditions as shown in Table 27. The results are shown in Table 29 (Catalysts $E_{29}$-9 to $E_{29}$-12).

As seen from Table 29, the catalyst ($E_{29}$-1 to $E_{29}$-6 and $E_{29}$-9 to $E_{29}$-12) reactivated in two steps are much more recovered in catalytic activity than the catalysts reactivated in one step.

EXAMPLE 34

The reactivated catalysts as obtained in Example 33 (Catalysts $E_{29}$-1, $E_{29}$-7 and $E_{29}$-8) were each subjected to further treatment for reactivation under the conditions as shown in Table 30. The thus reactivated catalysts were each reused for continuous hydro-cracking under the same conditions as shown in Table 27. The results are shown in Table 30.

As seen from Table 30, the catalysts ($F_{30}$-1 to $F_{30}$-11) reactivated in three steps are more recovered in catalytic activity than the catalysts reactivated in two steps.

EXAMPLE 35

A catalyst comprising 0.3% of ruthenium deposited on spheroidal particles of alumina of 4 mm in diameter (hereinafter referred to as "Catalyst $A_{32}$") (1000 ml) was charged into a tubular reactor of 1 inch in diameter, and naphtha (content of sulfur, 2 ppm; final boiling point, 110° C.) and hydrogen were fed therein to effect continuously hydro-cracking reaction for 200 hours under the conditions as shown in Table 31.

After 200 hours, the catalyst (hereinafter referred to as "Catalyst $B_{32}$") was treated under the same conditions as shown in Table 32 for reactivation. The reacti-

Table 30

| Catalyst<br>Catalyst used | | $F_{30}$-1<br>$E_{29}$-1 | $F_{30}$-2<br>$E_{29}$-1 | $F_{30}$-3<br>$E_{29}$-1 | $F_{30}$-4<br>$E_{29}$-1 | $F_{30}$-5<br>$E_{29}$-1 | $F_{30}$-6<br>$E_{29}$-7 | $F_{30}$-7<br>$E_{29}$-7 | $F_{30}$-8<br>$E_{29}$-7 | $F_{30}$-9<br>$E_{29}$-7 | $F_{30}$-10<br>$E_{29}$7 | $F_{30}$-11<br>$E_{29}$-8 |
|---|---|---|---|---|---|---|---|---|---|---|---|---|
| Conditions of treatment for reactivation | Reactivating agent | 0.4% Hydrazine | 0.5% Formaldehyde | 0.3% Sodium borohydride | 0.3% Lithium aluminum hydride | 0.3% Glucose | 0.4% Hydrazine | 0.4% Formaldehyde | 0.3% Sodium borohydride | 0.7% Sodium tartrate | 2.0% Sodium formate | 1.0% Hydrazine |
| | Temperature (°C.) | 20 | 20 | 20 | 20 | 20 | 20 | 20 | 20 | 20 | 20 | 60 |
| | Pressure (ata) | 1.0 | 1.0 | 1.0 | 1.0 | 1.0 | 1.0 | 1.0 | 1.0 | 1.0 | 1.0 | 1.0 |
| | Time (hrs) | 3.0 | 3.0 | 3.0 | 3.0 | 3.0 | 3.0 | 3.0 | 3.0 | 3.0 | 3.0 | 3.0 |
| | Post-treatment | | | | | Water washing: 75° C., 3 hrs. Drying: 100° C., 16 hrs. | | | | | | |
| Elimination percentage of poisonous materials (%) | Carbonaceous materials | 80 | 81 | 81 | 81 | 81 | 80 | 80 | 80 | 80 | 80 | 80 |
| | Sulfurous materials | 96 | 90 | 95 | 92 | 92 | 92 | 97 | 90 | 91 | 93 | 94 |
| Specific surface area (m²/g-Ru) | | 41 | 40 | 40 | 40 | 40 | 37 | 36 | 35 | 36 | 36 | 39 |
| Conversion of hydrogen (%) | | 75 | 74 | 74 | 75 | 73 | 45 | 44 | 42 | 44 | 44 | 49 |

Table 29

| Catalyst<br>Catalyst used | | $E_{29}$-1<br>$C_{28}$-1 | $E_{29}$-2<br>$C_{28}$-1 | $E_{29}$-3<br>$C_{28}$-1 | $E_{29}$-4<br>$C_{28}$-1 | $E_{29}$-5<br>$C_{28}$-2 | $E_{29}$-6<br>$C_{28}$-5 | $E_{29}$-7<br>$C_{28}$-1 | $E_{29}$-8<br>$C_{28}$-1 | $E_{29}$-9<br>$D_{28}$-1 | $E_{29}$-10<br>$D_{28}$-2 | $E_{29}$-11<br>$D_{28}$-3 | $E_{29}$-12<br>$D_{28}$-4 |
|---|---|---|---|---|---|---|---|---|---|---|---|---|---|
| Conditions of treatment for reactivation | Reactivating agent | 0.375N NaOH | 0.375N NaOH | 0.375N Na₂CO₃ | 0.375N Ba(OH)₂ | 0.1N NaOH | 0.375N NaOH | 0.375N NaOH | 0.375N NaOH | H₂ | H₂O:N₂ (3:1 by mol) | H₂ | H₂O:N₂ (3:1 by mol) |
| | Temperature (°C.) | 50 | 80 | 100 | 100 | 100 | 80 | 30 | 30 | 600 | 650 | 600 | 650 |
| | Pressure (ata) | 1.0 | 1.0 | 1.0 | 1.0 | 1.0 | 1.0 | 1.0 | 1.0 | 6.0 | 6.0 | 6.0 | 6.0 |
| | Time (hrs) | 6.0 | 1.5 | 3.0 | 3.0 | 1.5 | 1.5 | 10.0 | 3.0 | 6.0 | 12.0 | 6.0 | 12.0 |
| | Post-treatment | | | Water washing: 100° C., 2 hrs. Drying: 100° C., 16 hrs. | | | | | | — | — | — | — |
| Elimination percentage of poisonous materials (%) | Carbonaceous materials | 79 | 84 | 83 | 81 | 81 | 100 | 78 | 78 | 86 | 100 | 85 | 100 |
| | Sulfurous materials | 83 | 96 | 94 | 88 | 90 | 97 | 80 | 51 | 89 | 87 | 83 | 80 |
| Specific surface area (m²/g-Ru) | | 34 | 41 | 40 | 38 | 40 | 41 | 31 | 30 | 34 | 36 | 32 | 31 |
| Conversion of hydrogen (%) | | 60 | 78 | 75 | 74 | 75 | 78 | 9 | 7 | 78 | 78 | 75 | 65 |

Table 31

| | |
|---|---|
| Temperature of reactor at inlet | 265° C. |
| Pressure | 46 atm. (absolute) |
| Ratio of hydrogen/hydrocarbon | 1.20 (by mol) |
| Mass velocity | 500 kg-mol/m² . hr | vated catalyst was reused in hydro-cracking reaction under the same conditions as mentioned above. The results are shown in Table 32.

As seen from Table 32, treatment with a gaseous material is extremely effective in removal of carbonaceous materials but is insufficient in removal of sulfurous materials. In addition, it is almost ineffective in recovery of the dispersibility. Thus, recovery of the catalytic activity is not substantially recognized. Treatment with an inorganic alkaline substance is effective not only in removal of sulfurous materials and recovery of the dispersibility but also in recovery of the catalytic activity.

Table 32

| Catalyst | | A₃₂ | B₃₂ | C₃₂-1 | C₃₂-2 | C₃₂-3 | C₃₂-4 | C₃₂-5 | Reactivated D₃₂-1 | D₃₂-2 | D₃₂-3 | D₃₂-4 | D₃₂-5 | D₃₂-6 | D₃₂-7 | D₃₂-8 | D₃₂-9 |
|---|---|---|---|---|---|---|---|---|---|---|---|---|---|---|---|---|---|
| Conditions of treatment for reactivation | Reactivating agent | — | — | $H_2$ | $H_2:H_2O$ (1:1 by mol) | $H_2O:N_2$ (3:1 by mol) | $O_2:N_2$ (21:79 by volume) | $O_2:H_2O:N_2$ (10:50:40 by volume) | 0.375N NaOH | 0.375N NaOH | 0.375N NaOH | 0.375N NaOH | 0.375N Na₂CO₃ | 0.375N Ba(OH)₂ | 0.1N NaOH | 0.375N Na₂CO₃ | 0.375N Ba(OH)₂ |
| | Temperature (°C.) | — | — | 600 | 600 | 650 | 500 | 600 | 30 | 30 | 50 | 100 | 100 | 100 | 100 | 80 | 100 |
| | Pressure (ata) | — | — | 6.0 | 6.0 | 6.0 | 6.0 | 6.0 | 1.0 | 1.0 | 1.0 | 1.0 | 1.0 | 1.0 | 1.0 | 1.0 | 1.0 |
| | Time (hrs) | — | — | 6.0 | 6.0 | 12.0 | 5.0 | 10.0 | 3.0 | 10.0 | 6.0 | 3.0 | 3.0 | 3.0 | 3.0 | 3.0 | 1.5 |
| | Post-treatment | — | — | — | — | — | — | — | — | — | — | Water washing: 100° C., 2 hrs. Drying: 100° C., 16 hrs. | | | | | |
| Elimination percentage of poisonous materials (%) | Carbonaceous materials | — | — | 76 | 78 | 100 | 100 | 100 | 10 | 30 | 35 | 47 | 43 | 40 | 29 | 37 | 38 |
| | Sulfurous materials | — | — | 28 | 31 | 34 | 42 | 40 | 40 | 73 | 79 | 90 | 86 | 82 | 76 | 78 | 77 |
| Specific surface area (m²/g-Ru) | | 43 | 25 | 25 | 25 | 25 | 23 | 24 | 27 | 28 | 31 | 36 | 36 | 32 | 30 | 31 | 30 |
| Conversion of hydrogen (%) | | 89 | 5 | 5 | 6 | 7 | 5 | 5 | 6 | 8 | 50 | 68 | 68 | 68 | 66 | 65 | 60 |

EXAMPLE 36

The reactivated catalysts as obtained in Example 35 (Catalysts $D_{32}$-7, $D_{32}$-8 and $D_{32}$-9) were each subjected to further treatment for reactivation under the conditions as shown in Table 33. The thus reactivated catalysts were each reused for continuous hydro-cracking under the same conditions as shown in Table 31. The results are shown in Table 33.

As seen from Table 33, the catalysts reactivated in two steps are much more recovered in catalytic activity than the catalysts reactivated in one step.

Table 33

| Catlayst | | $E_{33}$-1 | $E_{33}$-2 | $E_{33}$-3 | $E_{33}$-4 | $E_{33}$-5 |
|---|---|---|---|---|---|---|
| Catalyst used | | $D_{32}$-7 | $D_{32}$-7 | $D_{32}$-7 | $D_{32}$-8 | $D_{32}$-9 |
| Conditions of treatment for reactivation | Reactivating agent | $H_2$ | $H_2:H_2O$ (1:1 by mol) | $O_2:H_2O:N_2$ (10:50:40 by volume) | $H_2$ | $H_2:H_2O$ 1:1 by mol) |
| | Temperature (°C.) | 600 | 600 | 600 | 650 | 650 |
| | Pressure (ata) | 6.0 | 6.0 | 6.0 | 6.0 | 6.0 |
| | Time (hrs) | 6.0 | 6.0 | 10.0 | 12.0 | 12.0 |
| | Post-treatment | — | — | — | — | — |
| Elimination percentage of poisonous materials (%) | Carbonaceous materials | 83 | 85 | 100 | 100 | 100 |
| | Sulfurous materials | 80 | 81 | 84 | 81 | 82 |
| Specific surface area ($m^2$/g-Ru) | | 31 | 31 | 30 | 30 | 30 |
| Conversion of hydrogen (%) | | 73 | 73 | 73 | 72 | 68 |

EXAMPLE 37

The reactivated catalysts as obtained in Example 35 (Catalysts $D_{32}$-1 to $D_{32}$-5 and $D_{32}$-9) were each subjected to further treatment for reactivation under the conditions as shown in Table 34. The thus reactivated catalysts were each reused for continuous hydro-cracking under the same conditions as shown in Table 31. The results are shown in Table 34.

As seen from Table 34, the catalysts reactivated in two steps are much more recovered in catalytic activity than the catalysts reactivated in one step.

Table 34

| Catalyst | | $F_{34}$-1 | $F_{34}$-2 | $F_{34}$-3 | $F_{34}$-4 | $F_{34}$-5 | $F_{34}$-6 | $F_{34}$-7 | $F_{34}$-8 | $F_{34}$-9 | $F_{34}$-10 |
|---|---|---|---|---|---|---|---|---|---|---|---|
| Catalyst used | | $D_{32}$-1 | $D_{32}$-2 | $D_{32}$-3 | $D_{32}$-3 | $D_{32}$-3 | $D_{32}$-4 | $D_{32}$-8 | $D_{32}$-8 | $D_{32}$-9 | $D_{32}$-9 |
| Conditions of treatment for reactivation | Reactivating agent | 1.0% Hydrazine | 0.4% Hydrazine | 0.3% Lithium aluminum hydride | 0.5% Formaldehyde | 0.3% Sodium borohydride | 0.3% Glucose | 0.5% Formaldehyde | 0.7% Sodium tartrate | 0.4% Hydrazine | 2.0% Sodium formate |
| | Temperature (°C.) | 60 | 20 | 20 | 20 | 20 | 20 | 20 | 20 | 20 | 20 |
| | Pressure (ata) | 1.0 | 1.0 | 1.0 | 1.0 | 1.0 | 1.0 | 1.0 | 1.0 | 1.0 | 1.0 |
| | Time (hrs) | 3.0 | 3.0 | 3.0 | 3.0 | 3.0 | 3.0 | 3.0 | 3.0 | 3.0 | 3.0 |
| | Post-treatment | | | | | Water washing: 75° C., 3 hrs. Drying: 100° C., 16 hrs. | | | | | |
| Elimination percentage of poisonous materials (%) | Carbonaceous materials | 10 | 30 | 35 | 35 | 35 | 47 | 37 | 37 | 38 | 38 |
| | Sulfurous materials | 90 | 91 | 95 | 95 | 95 | 98 | 90 | 89 | 92 | 90 |
| Specific surface area ($m^2$/g-Ru) | | 37 | 38 | 38 | 38 | 37 | 41 | 38 | 38 | 38 | 38 |
| Conversion of hydrogen (%) | | 70 | 70 | 71 | 68 | 70 | 71 | 70 | 70 | 71 | 72 |

EXAMPLE 38

The reactivated catalysts as obtained in Example 37 (Catalysts $F_{34}$-1, $F_{34}$-3 and $F_{34}$-5 to $F_{34}$-7) were each subjected to further treatment for reactivation under the conditions as shown in Table 35. The thus reactivated catalysts were each reused for continuous hydro-cracking under the same conditions as shown in Table 31. The results are shown in Table 35.

As seen from Table 35, the catalysts ($G_{35}$-1 to $G_{35}$-5) reactivated in three steps are much more recovered in catalytic activity than the catalysts reactivated in two step.

Table 35

| Catalyst<br>Catalyst used | | $G_{35}$-1<br>$F_{34}$-1 | $G_{35}$-2<br>$F_{34}$-3 | $G_{35}$-3<br>$F_{34}$-5 | $G_{35}$-4<br>$F_{34}$-6 | $G_{35}$-5<br>$F_{34}$-7 |
|---|---|---|---|---|---|---|
| Conditions of treatment for reactivation | Reactivating agent | $H_2$ | $H_2$ | $H_2:H_2O$ (1:1 by mol) | $H_2O:N_2$ (3:1 by mol) | $O_2:H_2O:N_2$ (10:50:40 by volume) |
| | Temperature (°C.) | 650 | 600 | 600 | 650 | 600 |
| | Pressure (ata) | 6.0 | 6.0 | 6.0 | 6.0 | 6.0 |
| | Time (hrs) | 12.0 | 6.0 | 6.0 | 12.0 | 10.0 |
| | Post-treatment | — | — | — | — | — |
| Elimination percentage of poisonous materials (%) | Carbonaceous materials | 100 | 84 | 85 | 100 | 100 |
| | Sulfurous materials | 96 | 97 | 97 | 97 | 96 |
| Specific surface area ($m^2$/g-Ru) | | 38 | 39 | 38 | 41 | 39 |
| Conversion of hydrogen (%) | | 77 | 78 | 76 | 79 | 78 |

EXAMPLE 39

The reactivated catalysts (Catalysts $E_{33}$-1 and $G_{35}$-4) respectively as obtained in Examples 36 and 38 were reused for continuous hydro-cracking under the conditions as shown in Table 31. The reactivated catalysts showed the same tendency as a freshly prepared catalyst (Catalyst $A_{32}$) in depression of the catalytic activity.

EXAMPLE 40

A catalyst comprising 0.3% of platinum deposited on spheroidal particles of alumina of 4 mm in diameter as a carrier material (hereinafter referred to as "Catalyst $A_{37}$") (1000 ml) was charged into a tubular reactor of 1 inch in diameter, and a gaseous mixture comprising naphtha (content of sulfur, 2 ppm; final boiling point, 105° C.) and hydrogen was fed therein to effect continuous hydro-cracking reaction for 200 hours under the conditions as shown in Table 36.

Table 36

| | |
|---|---|
| Temperature of reactor at inlet | 260° C. |
| Pressure | 46 atm. (absolute) |

Table 36-continued

| | |
|---|---|
| Ratio of hydrogen/hydrocarbon | 1.4 (by mol) |
| Mass velocity | 500 kg-mol/$m^2$ . hr |

After 200 hours, the resultant catalyst (hereinafter referred to as "Catalyst $B_{37}$") was treated under the conditions as shown in Table 37 for reactivation. The reactivated catalyst was reused in hydro-cracking reaction under the same conditions as mentioned above. The results are shown in Table 37.

As seen from Table 37, the reactivation treatment with hydrogen or hydrogen-steam is extremely effective for elimination of carbonaceous materials, but removal of sulfurous materials is insufficient and the dispersibility can be hardly recovered so that recovery of the catalytic activity is scarcely observed (Catalysts $C_{37}$-1 and $C_{37}$-2). In the case of treatment with an inorganic alkaline substance at room temperature for a long time, elimination of sulfurous materials and recovery of the dispersibility are good, but recovery of the catalytic activity is not well recognized (Catalysts $D_{37}$-1 and $D_{37}$-2). When treated with an inorganic alkaline substance under heating, the catalytic activity is highly recovered.

Table 37

| Catalyst | | $A_{37}$ | $B_{37}$ | Reactivated | | | | | | |
|---|---|---|---|---|---|---|---|---|---|---|
| | | | | $C_{37}$-1 | $C_{37}$-2 | $D_{37}$-1 | $D_{37}$-2 | $D_{37}$-3 | $D_{37}$-4 | $D_{37}$-5 |
| Conditions of treatment for reactivation | Reactivating agent* | — | — | $H_2$ | $H_2:H_2O$ (1:1 by mol) | 0.375N NaOH | 0.375N NaOH | 0.375N NaOH | 0.375N $Na_2CO_3$ | 0.375N $Ba(OH)_2$ |
| | Temperature (°C.) | — | — | 600 | 600 | 30 | 50 | 100 | 100 | 100 |
| | Pressure (ata) | — | — | 6.0 | 6.0 | 1.0 | 1.0 | 1.0 | 1.0 | 1.0 |
| | Time (hrs) | — | — | 6.0 | 6.0 | 10.0 | 6.0 | 1.5 | 3.0 | 3.0 |
| | Post-treatment | — | — | — | — | Water washing: 100° C., 2 hrs. Drying: 100° C., hrs. | | | | |
| Elimination percentage of poisonous materials (%) | Carbonaceous materials | — | — | 76 | 78 | 30 | 35 | 44 | 43 | 40 |
| | Sulfurous materials | — | — | 26 | 31 | 73 | 79 | 88 | 86 | 82 |

Table 37-continued

| Catalyst | $A_{37}$ | $B_{37}$ | Reactivated | | | | | | |
|---|---|---|---|---|---|---|---|---|---|
| | | | $C_{37}$-1 | $C_{37}$-2 | $D_{37}$-1 | $D_{37}$-2 | $D_{37}$-3 | $D_{37}$-4 | $D_{37}$-5 |
| Specific surface area ($m^2$/g-Ru) | 42 | 24 | 24 | 25 | 27 | 30 | 34 | 37 | 32 |
| Conversion of hydrogen (%) | 85 | 5 | 7 | 6 | 5 | 50 | 68 | 69 | 69 |

EXAMPLE 41

A catalyst comprising 1.0% of ruthenium deposited on spheroidal particles of alumina of 4 mm in diameter as a carrier material (hereinafter referred to as "Catalyst $A_{39}$") (250 ml) was charged into a tubular reactor of 1 inch in diameter, and a gaseous mixture comprising methanol (content of sulfur, 1 ppm) and hydrogen was fed therein to effect continuously hydro-cracking reaction for 200 hours under the conditions as shown in Table 38.

Table 38

| Temperature of reactor at inlet | 470° C. |
|---|---|
| Pressure | 10 atm. (absolute) |
| Ratio of hydrogen/methanol | 1.1 (by mol) |
| Mass velocity | 500 kg-mol/$m^2$ . hr |

After 200 hours, the resultant catalyst (hereinafter referred to as "Catalyst $B_{39}$") was treated under the conditions as shown in Table 39 for reactivation. The reactivated catalyst was reused in hydro-cracking reaction under the same conditions as mentioned above. The results are shown in Table 39.

As seen from Table 39, the reactivation treatment with hydrogen or hydrogen-steam is extremely effective for elimination of carbonaceous materials, but removal of sulfurous materials is insufficient and the dispersibility can be hardly recovered so that recovery of the catalytic activity is scarcely observed (Catalysts $C_{39}$-1 and $C_{39}$-2). In the case of treatment with an inorganic alkaline substance at room temperature for a long time, elimination of sulfurous materials and recovery of the dispersibility are good, but recovery of the catalytic activity is not well recognized (Catalysts $D_{39}$-1 and $D_{39}$-2). When treated with an inorganic alkaline substance under heating, the catalytic activity is highly recovered (Catalysts $D_{39}$-3 to $D_{39}$-5). Sole treatment with an aqueous solution of a reducing substance is effective in elimination of sulfurous materials but not in elimination of carbonaceous materials. Nevertheless, a tendency to recovery of the catalytic activity is seen (Catalysts $D_{39}$-6 to $D_{39}$-8).

Table 39

| Catalyst | | $A_{39}$ | $B_{39}$ | Reactivated | | | | | | | | |
|---|---|---|---|---|---|---|---|---|---|---|---|---|
| | | | | $C_{39}$-1 | $C_{39}$-2 | $D_{39}$-1 | $D_{39}$-2 | $D_{39}$-3 | $D_{39}$-4 | $D_{39}$-5 | $D_{39}$-6 | $D_{39}$-7 | $D_{39}$-8 |
| Conditions of treatment for reactivation | Reactivating agent | — | — | $H_2$ | $H_2$:$H_2O$ (1:1 by mol) | 0.375N NaOH | 0.375N NaOH | 0.375N NaOH | 0.375N $Na_2CO_3$ | 0.375N $Ba(OH)_2$ | 0.4% Hydrazine | 0.3% Glucose | 1.0% Formaldehyde |
| | Temperature (°C.) | — | — | 600 | 600 | 30 | 50 | 100 | 100 | 100 | 20 | 20 | 60 |
| | Pressure (ata) | — | — | 6.0 | 6.0 | 1.0 | 1.0 | 1.0 | 1.0 | 1.0 | 1.0 | 1.0 | 1.0 |
| | Time (hrs) | — | — | 6.0 | 6.0 | 10.0 | 6.0 | 1.5 | 3.0 | 3.0 | 3.0 | 3.0 | 3.0 |
| | Post-treatment | — | — | — | — | Water washing: 100° C., 2 hrs. Drying: 100° C., 16 hrs. | | | | | Water washing: 75° C., 3 hrs. Drying: 100° C., 16 hrs. | | |
| Elimination percentage of poisonous materials (%) | Carbonaceous materials | — | — | 75 | 76 | 10 | 35 | 45 | 43 | 40 | 0 | 0 | 0 |
| | Sulfurous materials | — | — | 24 | 25 | 40 | 80 | 89 | 85 | 84 | 70 | 51 | 69 |
| Specific surface area ($mg^2$/g-Ru) | | 42 | 18 | 18 | 18 | 22 | 26 | 31 | 30 | 28 | 26 | 27 | 27 |
| Amount of catalyst required (ml) | | 80 | — | — | — | 200 | 148 | 120 | 122 | 130 | 152 | 151 | 150 |

EXAMPLE 42

The reactivated catalysts as obtained in Example 41 (Catalysts $D_{39}$-1 to $D_{39}$-4) were each subjected to further treatment for reactivation under the conditions as shown in Table 40. The thus reactivated catalysts were each reused for continuous hydro-cracking under the same conditions as shown in Table 38. The results are shown in Table 40.

As seen from Table 40, the catalysts ($E_{40}$-1 to $E_{40}$-5) are effectively recovered in catalytic activity.

Table 40

| Catalyst Catalyst used | | $E_{40}$-1 $D_{39}$-1 | $E_{40}$-2 $D_{39}$-2 | $E_{40}$-3 $D_{39}$-3 | $E_{40}$-4 $D_{39}$-3 | $E_{40}$-5 $D_{39}$-4 |
|---|---|---|---|---|---|---|
| Conditions of treatment for reactivation | Reactivating agent | 1.0% Hydrazine | 0.4% Hydrazine | 0.4% Hydrazine | 0.5% Formaldehyde | 0.4% Hydrazine |
| | Temperature (°C.) | 60 | 20 | 20 | 20 | 20 |
| | Pressure (ata) | 1.0 | 1.0 | 1.0 | 1.0 | 1.0 |
| | Time (hrs) | 3.0 | 3.0 | 3.0 | 3.0 | 3.0 |
| | Post-treatment | Water washing: 75° C., 3 hrs. Drying: 100° C., 16 hrs. | | | | |
| Elimination percentage of | Carbonaceous materials | 10 | 35 | 45 | 45 | 43 |

Table 40-continued

| Catalyst<br>Catalyst used | $E_{40}$-1<br>$D_{39}$-1 | $E_{40}$-2<br>$D_{39}$-2 | $E_{40}$-3<br>$D_{39}$-3 | $E_{40}$-4<br>$D_{39}$-3 | $E_{40}$-5<br>$D_{39}$-4 |
|---|---|---|---|---|---|
| poisonous Sulfurous materials materials (%) | 90 | 94 | 96 | 98 | 96 |
| Specific surface area ($m^2$/g-Ru) | 30 | 32 | 35 | 35 | 34 |
| Amount of catalyst required (ml) | 122 | 110 | 95 | 95 | 98 |

EXAMPLE 43

A catalyst comprising 1.5% of ruthenium and 0.1% of chromium oxide deposited on spheroidal particles of alumina of 4 mm in diameter as a carrier material (hereinafter referred to as "Catalyst $A_{41}$") (290 ml) was charged into a tubular reactor of 1 inch in diameter, and a gaseous mixture comprising methane and air was fed therein to effect continuously partial combustion reaction for 500 hours under the following conditions:

Temperature of reactor: inlet, 310° C., outlet, 700° C;
Space velocity: 17500 (1/hr);
Ratio of air/methane: 2.37 (by mol);
Pressure: 1 atm. (absolute)

After 500 hours, the resultant catalyst (hereinafter referred to as "Catalyst $B_{41}$") was treated under the conditions as shown in Table 41 for reactivation. The reactivated catalyst was reused in partial combustion reaction under the same conditions as mentioned above. The results are shown in Table 41.

As seen from Table 41, the reactivation treatment with hydrogen is extremely effective for elimination of carbonaceous materials, but removal of sulfurous materials is insufficient and the dispersibility can be hardly recovered so that recovery of the catalytic activity is scarcely observed (Catalyst $C_{41}$-1). In the case of treatment with an inorganic alkaline substance at room temperature for a long time, elimination of sulfurous materials and recovery of the dispersibility are good, but recovery of the catalytic activity is not well recognized (Catalysts $D_{41}$-1 and $D_{41}$-2). Treatment with an inorganic alkaline substance under heating is per se effective in recovery of the catalytic activity (Catalysts $D_{41}$-3 to $D_{41}$-5 and $D_{41}$-14 to $D_{41}$-16). Treatment with an aqueous solution of a reducing substance is effective in elimination of sulfurous materials but not in elimination of carbonaceous materials and recovery of the dispersibility. Nevertheless, a tendency to recovery of the catalytic activity is seen (Catalysts $D_{41}$-6 to $D_{41}$-13).

Table 41

| Catalyst | A41 | B41 | C41-1 | Reactivated D41-1 | D41-2 | D41-3 | D41-4 | D41-5 | D41-6 | D41-7 | D41-8 | D41-9 | D41-10 | D41-11 | D41-12 | D41-13 | D41-14 | D41-15 | D41-16 |
|---|---|---|---|---|---|---|---|---|---|---|---|---|---|---|---|---|---|---|---|
| Conditions of treatment for reactivation — Reactivating agent | — | — | $H_2$ | 0.375N NaOH | 0.375N NaOH | 0.375N NaOH | 0.375N NaOH | 0.375N NaOH | 0.4% Hydrazine | 0.3% Lithium aluminum hydride | 0.7% Sodium tartrate | 2.0% Sodium formate | 0.3% Glucose | 1.0% Hydrazine | 1.0% Formaldehyde | 1.0% Sodium borohydride | 3.0N NaOH | 0.375N $Na_2CO_3$ | 0.375N $Ba(OH)_2$ |
| Temperature (°C.) | — | — | 650 | 30 | 30 | 50 | 100 | 148 | 20 | 20 | 20 | 20 | 20 | 60 | 60 | 60 | 100 | 100 | 100 |
| Pressure (ata) | — | — | 6.0 | 1.0 | 1.0 | 1.0 | 1.0 | 5.0 | 1.0 | 1.0 | 1.0 | 1.0 | 1.0 | 1.0 | 1.0 | 1.0 | 1.0 | 1.0 | 1.0 |
| Time (hrs) | — | — | 12.0 | 3.0 | 10.0 | 6.0 | 3.0 | 1.0 | 3.0 | 3.0 | 3.0 | 3.0 | 3.0 | 3.0 | 3.0 | 3.0 | 3.0 | 3.0 | 3.0 |
| Post-treatment | — | — | — | Water washing: 100° C., 16 hrs. Drying: 100° C., 16 hrs. | Water washing: 100° C., 16 hrs. Drying: 100° C., 16 hrs. | Water washing: 100° C., 2 hrs. | | Water washing: 75° C., 16 hrs. Drying: 100° C., 16 hrs. | | Water washing: 75° C., 3 hrs Drying: 100° C., 16 hrs | | | | Water washing: 75° C., 3 hrs. Drying: 100° C., 16 hrs. | | | | Water washing: 100° C., 2 hrs. Drying: 100° C., 16 hrs. | |
| Elimination percentage of poisonous materials (%) — Carbonaceous materials | — | — | 100 | 12 | 41 | 43 | 52 | 58 | 0 | 0 | 0 | 0 | 0 | 0 | 0 | 0 | 54 | 50 | 48 |
| Sulfurous materials | — | — | 31 | 32 | 72 | 78 | 95 | 100 | 70 | 51 | 50 | 55 | 51 | 92 | 70 | 90 | 97 | 94 | 91 |
| Specific surface area ($m^2$/g-Ru) | 43 | 17 | 17 | 21 | 26 | 28 | 33 | 34 | 19 | 21 | 21 | 21 | 21 | 21 | 21 | 21 | 34 | 32 | 30 |
| Amount of catalyst required (ml) | 51 | — | — | — | — | 150 | 105 | 100 | 174 | 170 | 172 | 172 | 174 | 166 | 170 | 174 | 101 | 107 | 110 |

EXAMPLE 44

The reactivated catalysts as obtained in Example 43 (Catalysts $D_{41}$-1 to $D_{41}$-13) were each subjected to further treatment for reactivation under the conditions as shown in Table 42. The thus reactivated catalysts were each reused for continuous partial combustion under the same conditions as shown in Example 43. The results are shown in Table 42.

As seen from Table 42, the treatment for reactivation at the second step is quite effective for recovery of the catalytic activity.

Table 42

| Catalyst/Conditions | E42-1 D41-1 | E42-2 D41-2 | E42-3 D41-3 | E42-4 D41-3 | E42-5 D41-4 | E42-6 D41-4 | E42-7 D41-6 | E42-8 D41-6 | E42-9 D41-11 | E42-10 D41-12 | E42-11 D41-1 | E42-12 D41-2 | E42-13 D41-3 | E42-14 D41-3 | E42-15 D41-4 | E42-16 D41-4 | E42-17 D41-7 | E42-18 D41-8 | E42-19 D41-9 | E42-20 D41-9 |
|---|---|---|---|---|---|---|---|---|---|---|---|---|---|---|---|---|---|---|---|---|
| Reactivating agent | 1.0% Hydrazine | 0.4% Hydrazine | 0.4% Hydrazine | 0.5% Formaldehyde | 0.4% Hydrazine | 0.3% Sodium borohydride | 0.375N NaOH | 0.375N NaOH | 0.375N NaOH | 0.375N NaOH | 0.3% Lithium aluminum hydride | 0.3% Lithium aluminum hydride | 0.7% Sodium tartrate | 2.0% Sodium formate | 0.3% Lithium aluminum hydride | 0.3% Glucose | 0.375N NaOH | 0.1N NaOH | 0.375N NaOH | 0.375N NaOH |
| Conditions for reactivation: Temperature (°C.) | 60 | 20 | 20 | 20 | 20 | 20 | 50 | 100 | 100 | 80 | 20 | 20 | 20 | 20 | 20 | 20 | 50 | 100 | 100 | 80 |
| Pressure (ata) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Time (hrs) | 3.0 | 3.0 | 3.0 | 3.0 | 3.0 | 3.0 | 6.0 | 3.0 | 3.0 | 3.0 | 3.0 | 3.0 | 3.0 | 3.0 | 3.0 | 3.0 | 6.0 | 3.0 | 1.5 | 3.0 |
| Post-treatment | — | Water washing: 100° C., 16 hrs. Drying: 100° C., 16 hrs. | Water washing: 100° C., 16 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | — | Water Washing: 100° C., 2 hrs. Drying: 100° C., 16 hrs. | Water Washing: 100° C., 2 hrs. Drying: 100° C., 16 hrs. | Water Washing: 100° C., 2 hrs. Drying: 100° C., 16 hrs. | Water Washing: 100° C., 2 hrs. Drying: 100° C., 16 hrs. | — | Water washing: 100° C., 16 hrs. Drying: 100° C., 16 hrs. | Water washing: 100° C., 16 hrs. Drying: 100° C., 16 hrs. | Water washing: 75° C., 3 hrs. Drying: 100° C., 16 hrs. | Water washing: 75° C., 3 hrs. Drying: 100° C., 16 hrs. | — | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. | Water washing: 100° C., 2 hrs. Drying: 100° C., 16 hrs. |
| Elimination percentage of Carbonaceous materials | 12 | 41 | 43 | 43 | 52 | 52 | 43 | 54 | 53 | 47 | 12 | 41 | 43 | 43 | 52 | 52 | 43 | 44 | 46 | 47 |
| Sulfurous materials (%) | 91 | 93 | 95 | 95 | 97 | 96 | 92 | 97 | 96 | 92 | 68 | 88 | 91 | 92 | 96 | 96 | 91 | 90 | 94 | 93 |
| Specific surface area (m²/g-Ru) | 34 | 36 | 36 | 36 | 40 | 40 | 35 | 39 | 41 | 39 | 31 | 36 | 37 | 37 | 41 | 40 | 38 | 37 | 37 | 37 |
| Amount of catalyst required (ml) | 150 | 160 | 101 | 105 | 75 | 77 | 103 | 76 | 74 | 90 | 149 | 154 | 102 | 110 | 76 | 77 | 115 | 72 | 80 | 92 |

EXAMPLE 45

The reactivated catalyst as obtained in Example 43 (Catalyst $D_{41}$-3) was treated with a 0.7% aqueous solution of sodium tartrate at 20° C. under 1 atom. (absolute) for 3 hours, washed with water at 75° C. for 3 hours and dried at 100° C. for 16 hours. Then, the resulting catalyst was again subjected to treatment with a 0.375 N aqueous solution of sodium hydroxide at 50° C. under 1 atom. (absolute) for 6 hours and treatment with a 0.7% aqueous solution of sodium tartrate at 20° C. under 1 atom. (absolute) for 3 hours, followed by washing with water at 75° C. for 3 hours and drying at 100° C. for 16 hours. The thus reactivated catalyst was used for partial combustion under the same conditions as shown in Example 43. The results are shown in Table 43, from which it is understood that the repeating treatments are quite effective in recovery of the catalytic activity.

Table 43

| Catalyst | | F |
|---|---|---|
| Elimination percentage of poisonous materials (%) | Carbonaceous materials | 75 |
| | Sulfurous materials | 100 |
| Specific surface area ($m^2$/g-Ru) | | 42 |
| Amount of catalyst required (ml) | | 58 |

EXAMPLE 46

The reactivated catalyst as obtained in Example 44 (Catalyst $E_{42}$-5) was used for continuous partial combustion under the conditions as shown in Example 43. The reactivated catalyst showed the same tendency as a freshly prepared catalyst in depression of the catalytic activity.

EXAMPLE 47

A catalyst comprising 1.7% of ruthenium deposited on spheroidal particles of alumina of 4 mm in diameter as a carrier material (hereinafter referred to as "Catalyst $A_{45}$") (290 ml) was charged into a tubular reactor of 1 inch in diameter, and a gaseous mixture comprising methane and air was fed therein to effect continuously partial combustion reaction for 300 hours under the conditions as shown in Table 44.

Table 44

| Temperature of reactor | at inlet | 310° C. |
|---|---|---|
| | at outlet | 700° C. |
| Space velocity | | 17500 hr$^{-1}$ |
| Ratio of air/methane | | 2.37 (by mol) |
| Pressure | | 1 atm. (absolute) |

After 300 hours, the resultant catalyst (hereinafter referred to as "Catalyst $B_{45}$") was treated under the conditions as shown in Table 45 for reactivation. The reactivated catalyst was reused in partial combustion reaction under the same conditions as mentioned above. The results are shown in Table 45.

As seen from Table 45, the reactivation treatment with a gaseous material such as hydrogen, hydrogen-steam, oxygen-nitrogen or oxygen-nitrogen-steam is extremely effective for elimination of carbonaceous materials, but removal of sulfurous materials is insufficient and the dispersibility can be hardly recovered so that recovery of the catalytic activity is scarcely observed (Catalysts $C_{45}$-1 to $C_{45}$-5). In the case of treatment with an inorganic alkaline substance at room temperature, elimination of sulfurous materials is good but recovery of the catalytic activity is not seen. Treatment with an inorganic alkaline substance under heating is effective in elimination of sulfurous materials and recovery of the dispersibility, and recovery of the catalytic activity is recognized.

Table 45

| Catalyst | | $A_{45}$ | $B_{45}$ | $C_{45}$-1 | $C_{25}$-2 | $C_{45}$-3 | $C_{45}$-4 | $C_{45}$-5 | Reactivated $D_{45}$-1 | $D_{45}$-2 | $D_{45}$-3 | $D_{45}$-4 | $D_{45}$-5 |
|---|---|---|---|---|---|---|---|---|---|---|---|---|---|
| Conditions of treatment for reactivation | Reactivating agent | — | — | $H_2$ | $H_2$:$H_2O$ (1:1 by mol) | $H_2O$:$N_2$ (3:1 by mol) | $O_2$:$N_2$ (21:79 by volume) | $O_2$:$H_2O$:$N_2$ (10:50:40 by volume) | 0.375N NaOH | 0.375N $Na_2CO_3$ | 0.375N Ba(OH)$_2$ | 0.375N NaOH | 0.375N NaOH |
| | Temperature (°C.) | — | — | 600 | 600 | 650 | 500 | 600 | 100 | 100 | 100 | 50 | 30 |
| | Pressure (ata) | — | — | 6.0 | 6.0 | 6.0 | 6.0 | 6.0 | 1.0 | 1.0 | 1.0 | 1.0 | 1.0 |
| | Time (hrs) | — | — | 6.0 | 6.0 | 12.0 | 5.0 | 10.0 | 1.5 | 3.0 | 3.0 | 6.0 | 10.0 |
| | Post-treatment | — | — | — | — | — | — | — | Water washing: 100° C., 2 hrs. Drying: 100° C., 16 hrs. | | | | |
| Elimination percentage of poisonous materials (%) | Carbonaceous materials | — | — | 78 | 80 | 100 | 100 | 100 | 55 | 54 | 50 | 41 | 40 |
| | Sulfurous materials | — | — | 23 | 30 | 34 | 42 | 40 | 97 | 95 | 89 | 80 | 77 |
| Specific surface area ($m^2$/g-Ru) | | 43 | 19 | 19 | 19 | 19 | 17 | 18 | 35 | 36 | 33 | 28 | 28 |
| Amount of catalyst required (ml) | | 65 | — | — | — | — | — | — | 108 | 101 | 110 | 150 | — |

EXAMPLE 48

The reactivated catalysts as obtained in Example 47 (Catalysts $C_{45}$-1, $C_{45}$-2 and $C_{45}$-5) were each subjected to further treatment for reactivation under the conditions as shown in Table 46. The thus reactivated catalysts (Catalysts $E_{46}$-1 to $E_{46}$-7) were each reused for continuous partial combustion under the same conditions as shown in Table 44. The results are shown in Table 46, from which it is understood that the treatment with an inorganic alkaline substance under heating at the second step is quite effective in recovery of the catalytic activity.

Table 46

| Catalyst | | E46-1 | E46-2 | E46-3 | E46-4 | E46-5 | E46-6 | E46-7 |
|---|---|---|---|---|---|---|---|---|
| Catalyst used | | C45-1 | C45-1 | C45-1 | C45-1 | C45-2 | C45-5 | C45-1 |
| Conditions of treatment for reactivation | Reactivating agent | 0.375N NaOH | 0.375N NaOH | 0.375N NaOH | 0.375N Ba(OH)₂ | 0.1N NaOH | 0.375N NaOH | 0.375N NaOH |
| | Temperature (°C.) | 50 | 80 | 100 | 100 | 100 | 80 | 30 |
| | Pressure (ata) | 1.0 | 1.0 | 1.0 | 1.0 | 1.0 | 1.0 | 1.0 |
| | Time (hrs) | 3.0 | 1.5 | 1.5 | 2.0 | 1.5 | 1.5 | 10.0 |
| | Post-treatment | | | Water washing: 100° C., 2 hrs. Drying: 100° C., 16 hrs. | | | | |
| Elimination percentage of poisonous materials (%) | Carbonaceous materials | 81 | 86 | 85 | 83 | 83 | 100 | 80 |
| | Sulfurous materials | 85 | 98 | 96 | 90 | 92 | 99 | 82 |
| Specific surface area (m²/g-Ru) | | 31 | 38 | 37 | 37 | 37 | 38 | 28 |
| Amount of catalyst required (ml) | | 142 | 115 | 101 | 106 | 117 | 120 | — |

EXAMPLE 49

The reactivated catalysts as obtained in Example 48 (Catalyst E46 −1) were each subjected to further treatment for reactivation under the conditions as shown in Table 47. The thus reactivated catalysts (Catalysts F47−1 to F47−5) were each reused for continuous partial combustion under the same conditions as shown in Table 44. The results are shown in Table 47, from which it is understood that the treatment for reactivation in three steps results in higher recovery of the catalytic activity.

Table 47

| Catalyst | | F47-1 | F47-2 | F47-3 | F47-4 | F47-5 |
|---|---|---|---|---|---|---|
| Catalyst used | | E46-1 | E46-1 | E46-1 | E46-1 | E46-1 |
| Conditions of treatment for reactivation | Reactivating agent | 0.4% Hydrazine | 0.5% Formaldehyde | 0.3% Sodium borohydride | 0.3% Lithium aluminium hydride | 0.3% Glucose |
| | Temperature (°C.) | 20 | 20 | 20 | 20 | 20 |
| | Pressure (ata) | 1.0 | 1.0 | 1.0 | 1.0 | 1.0 |
| | Time (hrs) | 3.0 | 3.0 | 3.0 | 3.0 | 3.0 |
| | Post-treatment | | Water washing: 75° C., 3 hrs. Drying: 100° C., 16 hrs. | | | |
| Elimination percentage poisonous materials (%) | Carbonaceous materials | 82 | 82 | 82 | 82 | 82 |
| | Sulfurous materials | 98 | 92 | 97 | 94 | 94 |
| Specific surface area (m²/g-Ru) | | 40 | 39 | 39 | 39 | 39 |
| Amount of catalyst required (ml) | | 70 | 72 | 72 | 70 | 72 |

EXAMPLE 50

A catalyst comprising 1.0% of ruthenium and 0.1% of chromium oxide deposited on spheroidal particles of alumina of 4 mm in diameter as a carrier material (hereinafter referred to as "Catalyst A49") (290 ml) was charged into a tubular reactor of 1 inch in diameter, and a gaseous mixture comprising methane and air was fed therein to effect continuously partial combustion reaction for 300 hours under the conditions as shown in Table 48.

Table 48

| Temperature of reactor | at inlet | 310° C. |
|---|---|---|
| | at outlet | 700° C. |
| Space velocity | | 17500 hr⁻¹ |
| Ratio of air/methane | | 2.37 (by mol) |
| Pressure | | 1 atm. (absolute) |

After 300 hours, the resultant catalyst (hereinafter referred to as "Catalyst B49") was treated under the conditions as shown in Table 49 for reactivation. The reactivated catalyst was reused in partial combustion reaction under the same conditions as mentioned above. The results as shown in Table 49.

As seen from Table 49, the reactivation treatment with a gaseous material is extremely effective for elimination of carbonaceous materials, but removal of sulfurous materials is insufficient and the dispersibility can be hardly recovered so that recovery of the catalytic activity is scarcely observed. In the case of treatment with an inorganic alkaline substance, elimination of sulfurous materials and recovery of the dispersibility as well as recovery of the catalytic activity are good.

shown in Table 51, from which it is understood that the catalyst reactivated in two steps is more recovered in catalytic activity than the catalyst reactivated in one step.

Table 49

| | Catalyst | $A_{49}$ | $B_{49}$ | Reactivated | | | | |
|---|---|---|---|---|---|---|---|---|
| | | | | $C_{49}$-1 | $C_{49}$-2 | $D_{49}$-1 | $D_{49}$-2 | $D_{49}$-3 |
| Conditions of treatment for reactivation | Reactivating agent | — | — | $H_2$ | $O_2:H_2O:N_2$ (10:50:40 by volume) | 0.375N NaOH | 0.1N NaOH | 0.375N $Na_2CO_3$ |
| | Temperature (°C.) | — | — | 600 | 600 | 50 | 100 | 100 |
| | Pressure (ata) | — | — | 6.0 | 6.0 | 1.0 | 1.0 | 1.0 |
| | Time (hrs) | — | — | 6.0 | 10.0 | 6.0 | 3.0 | 3.0 |
| | Post-treatment | — | — | — | — | Water washing: 100° C., 2 hrs. Drying: 100° C., 16 hrs. | | |
| Elimination percentage of poisonous materials (%) | Carbonaceous materials | — | — | 75 | 100 | 43 | 40 | 51 |
| | Sulfurous materials | — | — | 21 | 37 | 78 | 80 | 93 |
| Specific surface area ($m^2$/g-Ru) | | 43 | 17 | 17 | 17 | 28 | 28 | 33 |
| Amount of catalyst required (ml) | | 83 | — | — | — | 140 | 120 | 115 |

EXAMPLE 51

The reactivated catalyst as obtained in Example 50 (Catalyst $D_{49}$—2) was subjected to further treatment for reactivation under the conditions as shown in Table 50. The thus reactivated catalyst was reused for continuous partial combustion under the same conditions as shown in Table 48. The results are shown in Table 50, from which is understood that the catalyst reactivated in two steps is more recovered in catalytic activity than the catalyst reactivated in one step.

Table 50

| Catalyst | | $E_{50}$-1 | $E_{50}$-2 |
|---|---|---|---|
| Catalyst used | | $D_{49}$-2 | $D_{49}$-2 |
| Conditions of treatment for reactivation | Reactivating agent | $H_2$ | $O_2:H_2O:N_2$ (10:50:40 by volume) |
| | Temperature (°C.) | 600 | 600 |
| | Pressure (ata) | 6.0 | 6.0 |
| | Time (hrs) | 6.0 | 10.0 |
| | Post-treatment | — | — |
| Elimination percentage of poisonous materials (%) | Carbonaceous materials | 85 | 100 |
| | Sulfurous materials | 85 | 89 |
| Specific surface area ($m^2$/g-Ru) | | 29 | 28 |
| Amount of catalyst required (ml) | | 115 | 114 |

EXAMPLE 52

The reactivated catalyst as obtained in Example 50 (Catalysts $D_{49}$—1 and $D_{49}$—3) was subjected to further treatment for reactivation under the conditions as shown in Table 51. The thus reactivated catalyst was reused for continuous partial combustion under the same conditions as shown in Table 48. The results are Table 51

| Catalyst | | $F_{51}$-1 | $F_{51}$-2 | $F_{51}$-3 |
|---|---|---|---|---|
| Catalyst used | | $D_{49}$-1 | $D_{49}$-1 | $D_{49}$-3 |
| Conditions of treatment for reactivation | Reactivating agent | 0.3% Lithium aluminum hydride | 0.3% Sodium borohydride | 0.3% Glucose |
| | Temperature (° C.) | 20 | 20 | 20 |
| | Pressure (ata) | 1.0 | 1.0 | 1.0 |
| | Time (hrs) | 3.0 | 3.0 | 3.0 |
| | Post-treatment | Water washing: 75° C., 3 hrs. Drying: 100° C., 16 hrs. | | |
| Elimination percentage of poisonous materials (%) | Carbonaceous materials | 43 | 43 | 52 |
| | Sulfurous materials | 96 | 96 | 97 |
| Specific surface area ($m^2$/g-Ru) | | 34 | 32 | 38 |
| Amount of catalyst required (ml) | | 94 | 97 | 90 |

EXAMPLE 53

The reactivated catalyst as obtained in Example 52 (Catalysts $F_{51}$—1 to $F_{51}$—3) were each subjected to further treatment for reactivation under the conditions as shown in Table 52. The thus reactivated catalyst were each reused for continuous partial combustion under the same conditions as shown in Table 48. The results are shown in Table 52, from which it is understood that the catalysts reactivated in three steps are more recovered in catalytic activity than the catalyst reactivated in two steps.

Table 52

| Catalyst | | $G_{52}$-1 | $G_{52}$-2 | $G_{52}$-3 |
|---|---|---|---|---|
| Catalyst used | | $F_{51}$-1 | $F_{51}$-2 | $F_{51}$-3 |
| Condi- | Reactivating | $H_2$ | $H_2:H_2O$ | $H_2O:N_2$ |

Table 52-continued

| Catalyst<br>Catalyst used | | $G_{52}$-1<br>$F_{51}$-1 | $G_{52}$-2<br>$F_{51}$-2 | $G_{52}$-3<br>$F_{51}$-3 |
|---|---|---|---|---|
| tions<br>of<br>treat-<br>ment<br>for<br>reacti-<br>vation | agent | | (1:1 by mol) | (3:1 by mol) |
| | Temperature (°C.) | 600 | 600 | 650 |
| | Pressure (ata) | 6.0 | 6.0 | 6.0 |
| | Time (hrs) | 6.0 | 6.0 | 12.0 |
| | Post-treat-ment | — | — | — |
| Elimina-<br>tion per-<br>centage<br>of<br>poisonous<br>materials<br>(%) | Carbo-<br>naceous<br>materials | 86 | 87 | 100 |
| | Sulfurous<br>materials | 98 | 98 | 99 |
| Specific surface area ($m^2$/g-Ru) | | 35 | 33 | 38 |
| Amount of catalyst required (ml) | | 92 | 95 | 89 |

EXAMPLE 54

The reactivated catalysts as obtained in Examples 51 and 53 (Catalysts $E_{50}$—1 and $G_{52}$—3) were each reused for continuous partial combustion under the same conditions as shown in Table 48. As the result, it was recognized that the reactivated catalysts show the same tendency as a freshly prepared catalyst (Catalyst $A_{49}$) in depression of the catalytic activity.

EXAMPLE 55

A catalyst comprising 1.0% of ruthenium deposited on spheroidal particles of alumina of 4 mm in diameter as a carrier material (hereinafter referred to as "Catalyst $A_{54}$") (290 ml) was charged into a tubular reactor of 1 inch in diameter, and a gaseous mixture comprising methanol (content of sulfur, 5 ppm) and air was fed therein to effect continuously partial combustion for 300 hours under the conditions as shown in Table 53.

Table 53

| Temperature of reactor | at inlet | 280° C. |
|---|---|---|
| | at outlet | 700° C. |
| Space velocity | | 17500 $hr^{-1}$ |
| Ratio of air/methanol | | 2.40 (by mol) |
| Pressure | | 1 atm. (absolute) |

After 300 hours, the resultant catalyst (hereinafter referred to as "Catalyst $B_{54}$") was treated under the conditions as shown in Table 54 for reactivation. The reactivated catalyst was reused in partial combustion reaction under the same conditions as mentioned above. The results are shown in Table 54.

As seen from Table 54, the reactivation treatment with hydrogen or hydrogen-steam is extremely effective for elimination of carbonaceous materials, but removal of sulfurous materials is insufficient and the dispersibility can be hardly recovered so that recovery of the catalytic activity is scarcely observed. In the case of treatment with an inorganic alkaline substance at room temperature for a long time, elimination of sulfurous materials and recovery of the dispersibility are good, but recovery of the catalytic activity is insufficient. Treatment with an inorganic alkaline substance under heating is proved to be effective for recovery of the catalytic activity. In treatment with a reducing substance, elimination of sulfurous materials is hardly attained. However, there is a tendency to recovery of the catalytic activity.

Table 54

| | | | | | | | Reactivated | | | | | |
|---|---|---|---|---|---|---|---|---|---|---|---|---|
| Catalyst | | $A_{54}$ | $B_{54}$ | $C_{54}$-1 | $C_{54}$-2 | $D_{54}$-1 | $D_{54}$-2 | $D_{54}$-3 | $D_{54}$-4 | $D_{54}$-5 | $D_{54}$-6 | $D_{54}$-7 | $D_{54}$-8 |
| Condi-<br>tions<br>of<br>treat-<br>ment<br>for<br>reacti-<br>vation | Reactivating agent | — | — | $H_2$ | $H_2$:$H_2O$ (1:1 by mol) | 0.375N NaOH | 0.375N NaOH | 0.375N NaOH | 0.375N $Na_2CO_3$ | 0.375N $Ba(OH)_2$ | 0.4% Hydra-zine | 0.3% Glucose | 1.0% Formal-dehyde |
| | Temperature (°C.) | — | — | 600 | 600 | 30 | 50 | 100 | 100 | 100 | 20 | 20 | 60 |
| | Pressure (ata) | — | — | 6.0 | 6.0 | 1.0 | 1.0 | 1.0 | 1.0 | 1.0 | 1.0 | 1.0 | 1.0 |
| | Time (hrs) | — | — | 6.0 | 6.0 | 10.0 | 6.0 | 1.5 | 3.0 | 3.0 | 3.0 | 3.0 | 3.0 |
| | Post-treat-ment | — | — | — | — | Water washing: 100° C., 2 hrs. Drying: 100° C., 16 hrs. | | | | | Water washing: 75° C., 3 hrs. Drying: 100° C., 16 hrs. | | |
| Elimina-<br>tion per-<br>centage<br>of<br>poisonous<br>materials<br>(%) | Carbo-<br>naceous<br>materials | — | — | 100 | 100 | 41 | 43 | 44 | 43 | 40 | 0 | 0 | 0 |
| | Sulfurous materials | — | — | 31 | 32 | 72 | 78 | 95 | 85 | 84 | 72 | 50 | 68 |
| Specific surface area ($m^2$/g-Ru) | | 43 | 13 | 13 | 17 | 20 | 24 | 29 | 28 | 26 | 22 | 23 | 23 |
| Amount of catalyst required (ml) | | 85 | — | — | — | — | 150 | 115 | 120 | 127 | 163 | 161 | 160 |

EXAMPLE 56

A catalyst comprising 2.0% of platinum deposited on spheroidal particles of alumina of 4 mm in diameter as a carrier material (hereinafter referred to as "Catalyst $A_{56}$") (290 ml) was charged into a tubular reactor of 1 inch in diameter, and a gaseous mixture comprising methane and air was fed therein to effect continuously partial combustion for 300 hours under the conditions as shown in Table 55.

Table 55

| Temperature of reactor | at inlet | 310° C. |
|---|---|---|
| | at outlet | 700° C. |

Table 55-continued

| Space velocity | 17500 hr$^{-1}$ |
|---|---|
| Ratio of air/methane | 2.37 (by mol) |
| Pressure | 1 atm. (absolute) |

After 300 hours, the resultant catalyst (hereinafter referred to as "Catalyst B$_{56}$") was treated under the conditions as shown in Table 56 for reactivation. The reactivated catalyst was reused in partial combustion reaction under the same conditions as mentioned above. The results are shown in Table 56.

As seen from Table 56, the reactivation treatment with hydrogen or hydrogen-steam is extremely effective for elimination of carbonaceous materials, but removal of sulfurous materials is insufficient and the dispersibility can be hardly recovered so that recovery of the catalytic activity is scarcely observed. In the case of treatment with an inorganic alkaline substance at room temperature, elimination of sulfurous materials and recovery of the dispersibility are relatively good when the treating time is long, but recovery of the catalytic activity is insufficient. Treatment with an inorganic alkaline substance under heating is proved to be effective for recovery of the catalytic activity. In treatment with a reducing substance, elimination of sulfurous material is good, but removal of carbonaceous materials is hardly attained. However, there is a tendency to recovery of the catalytic activity.

naphtha (content of sulfur, 2 ppm; final boiling point, 108° C.) and air was fed therein to effect continuous partial combustion for 200 hours under the conditions as shown in Table 57.

Table 57

| Temperature of reactor | at inlet | 350° C. |
|---|---|---|
| | at outlet | 900° C. |
| Pressure | | 1 atm. (absolute) |
| Ratio of air/naphtha | | 14.0 (by mol) |
| Space velocity | | 17500 cm hr$^{-1}$ |

After 200 hours, the resultant catalyst (hereinafter referred to as "Catalyst B$_{58}$") was treated under the conditions as shown in Table 58 for reactivation. The reactivated catalyst was reused in partial combustion reaction under the same conditions as mentioned above. The results are shown in Table 58.

As seen from Table 58, the reactivation treatment with a gaseous material is effective for elimination of carbonaceous materials, but removal of sulfurous materials is insufficient and the dispersibility can be hardly recovered so that recovery of the catalytic activity is scarcely observed. In the case of treatment with an inorganic alkaline substance at room temperature for a long time, elimination of sulfurous materials and recovery of the dispersibility are good, but recovery of the catalytic activity is not well recognized (Catalyst D$_{58}$−1). When treated with an inorganic alkaline sub-

Table 56

| Catalyst | | A$_{56}$ | B$_{56}$ | C$_{56}$-1 | C$_{56}$-2 | D$_{56}$-1 | D$_{56}$-2 | D$_{56}$-3 | D$_{56}$-4 | D$_{56}$-5 | D$_{56}$-6 | D$_{56}$-7 | D$_{56}$-8 |
|---|---|---|---|---|---|---|---|---|---|---|---|---|---|
| | | | | | | | | Reactivated | | | | | |
| Conditions of treatment for reactivation | Reactivating agent | — | — | H$_2$ | H$_2$:H$_2$O (1:1 by mol) | 0.375N NaOH | 0.375N NaOH | 0.375N NaOH | 0.375N Na$_2$CO$_3$ | 0.375N Ba(OH)$_2$ | 0.4% Hydrazine | 0.3% Glucose | 1.0% Formaldehyde |
| | Temperature (°C.) | — | — | 600 | 600 | 30 | 50 | 100 | 100 | 100 | 20 | 20 | 60 |
| | Pressure (ata) | — | — | 6.0 | 6.0 | 1.0 | 1.0 | 1.0 | 1.0 | 1.0 | 1.0 | 1.0 | 1.0 |
| | Time (hrs) | — | — | 6.0 | 6.0 | 10.0 | 6.0 | 1.5 | 3.0 | 3.0 | 3.0 | 3.0 | 3.0 |
| | Post-treatment | — | — | — | — | Water washing: 100° C., 2 hrs. Drying: 100° C., 16 hrs. | | | | | Water washing: 75° C., 3 hrs. Drying: 100° C., 16 hrs. | | |
| Elimination percentage of poisonous materials (%) | Carbonaceous materials | — | — | 75 | 76 | 40 | 42 | 44 | 43 | 40 | 0 | 0 | 0 |
| | Sulfurous materials | — | — | 22 | 27 | 72 | 79 | 94 | 86 | 86 | 74 | 52 | 70 |
| Specific surface area (m$^2$/g-Ru) | | 41 | 15 | 15 | 15 | 22 | 24 | 29 | 28 | 27 | 23 | 24 | 24 |
| Amount of catalyst required (ml) | | 48 | — | — | — | — | 87 | 73 | 75 | 77 | 90 | 94 | 92 |

EXAMPLE 57

A catalyst comprising 2.0% of ruthenium deposited on spheroidal particles of alumina of 4 mm in diameter as a carrier material (hereinafter referred to as "Catalyst A$_{58}$") (350 ml) was charged into a tubular reactor of 1 inch in diameter, and a gaseous mixture comprising stance under heating, the catalytic activity is highly recovered (Catalysts D$_{58}$−2 to D$_{58}$−5). Treatment with an aqueous solution of hydrazine or the like is effective in elimination of sulfurous materials but not in elimination of carbonaceous materials. However, a tendency to recovery of the catalytic activity is recognized (Catalysts D$_{58}$−6 to D$_{58}$−8).

Table 58

| Catalyst | | A$_{58}$ | B$_{58}$ | C$_{58}$-1 | C$_{58}$-2 | D$_{58}$-1 | D$_{58}$-2 | D$_{58}$-3 | D$_{58}$-4 | D$_{58}$-5 | D$_{58}$-6 | D$_{58}$-7 | D$_{58}$-8 |
|---|---|---|---|---|---|---|---|---|---|---|---|---|---|
| | | | | | | | | Reactivated | | | | | |
| Conditions of treat- | Reactivating agent | — | — | H$_2$ | H$_2$:H$_2$O (1:1 by mol) | 0.375N NaOH | 0.375N NaOH | 0.375N NaOH | 0.375N Na$_2$CO$_3$ | 0.375N Ba(OH)$_2$ | 0.4% Hydrazine | 0.3% Glucose | 1.0% Formaldehyde |

Table 58-continued

| Catalyst | | A$_{58}$ | B$_{58}$ | C$_{58}$-1 | C$_{58}$-2 | D$_{58}$-1 | D$_{58}$-2 | D$_{58}$-3 | D$_{58}$-4 | D$_{58}$-5 | D$_{58}$-6 | D$_{58}$-7 | D$_{58}$-8 |
|---|---|---|---|---|---|---|---|---|---|---|---|---|---|
| | | | | | | | Reactivated | | | | | | |
| ment for reactivation | Temperature (°C.) | — | — | 600 | 600 | 30 | 50 | 100 | 100 | 100 | 20 | 20 | 60 |
| | Pressure (ata) | — | — | 6.0 | 6.0 | 1.0 | 1.0 | 1.0 | 1.0 | 1.0 | 1.0 | 1.0 | 1.0 |
| | Time (hrs) | — | — | 6.0 | 6.0 | 10.0 | 6.0 | 1.5 | 3.0 | 3.0 | 3.0 | 3.0 | 3.0 |
| | Post-treatment | | | | | | Water washing: 100° C., 2 hrs. | | | | Water washing: 75° C., 3 hrs. | | |
| | | — | — | — | — | | Drying: 100° C., 16 hrs. | | | | Drying: 100° C., 16 hrs. | | |
| Elimination percentage of poisonous materials (%) | Carbonaceous materials | — | — | 100 | 100 | 48 | 51 | 52 | 53 | 51 | 0 | 0 | 0 |
| | Sulfurous materials | — | — | 23 | 25 | 70 | 80 | 93 | 90 | 91 | 70 | 51 | 69 |
| Specific surface area (m²/g-Ru) | | 42 | 11 | 11 | 14 | 17 | 22 | 28 | 29 | 27 | 26 | 27 | 27 |
| Amount of catalyst required (ml) | | 80 | — | — | — | — | 156 | 118 | 115 | 120 | 155 | 156 | 155 |

What is claimed is:

1. A method for reactivation of a platinum group metal catalyst which comprises contacting a platinum group metal catalyst lowered in the catalytic activity as the result of having been used for hydro-cracking of hydrocarbons or alkanols with an aqueous solution of an inorganic alkaline compound of alkali metal or alkaline earth metal or mixtures thereof in a concentration of 0.001 to 10 N at a temperature of 5° to 250° C. until the catalytic activity of the catalyst is substantially recovered.

2. The method according to claim 1, wherein the inorganic alkaline compound is a member selected from the group consisting of hydroxides, carbonates, nitrates and sulfates of sodium, potassium, calcium, magnesium, barium and stronthium.

3. The method according to claim 1, followed by treatment with at least one of hydrogen, oxygen and steam at a temperature of 350° to 750° C. under a pressure of 1 to 50 atm. (absolute) until poisonous materials deposited on the catalyst are eliminated.

4. The method according to claim 1, wherein the catalyst is previously treated with at least one of hydrogen, oxygen and steam at a temperature of 350° to 750° C. under a pressure of 1 to 10 atm. (absolute) until poisonous materials deposited on the catalyst are eliminated.

5. The method according to claim 1, wherein the catalyst is previously contacted with an aqueous solution of a reducing substance in a concentration of 0.01 to 10% by weight at a temperature of 5° to 250° C. for a period of 3 minutes to 80 hours and then treated with at least one of hydrogen, oxygen and steam at a temperature of 350° to 750° C. under a pressure of 1 to 50 atm. (absolute) until poisonous materials deposited on the catalyst are eliminated.

6. A method for reactivation of a platinum group metal catalyst which comprises contacting a platinum group metal catalyst lowered in the catalytic activity as the result of having been used for hydro-cracking of hydrocarbons or alkanols with an aqueous solution of a reducing substance in a concentration of 0.01 to 10% by weight at a temperature of 5° to 250° C. until the catalytic activity of the catalyst is substantially recovered.

7. The method according to claim 6, wherein the reducing substance is a member selected from the group consisting of hydrazine, formaldehyde, sodium borohydride, lithium aluminum hydride, sodium tartrate, potassium tartrate, sodium potassium tartrate, calcium tartrate, sodium hydrogen tartrate, sodium formate, potassium formate, calcium formate and glucose.

8. The method according to claim 6, followed by treatment with at least one of hydrogen, oxygen and steam at a temperature of 350° to 750° C. under a pressure of 1 to 50 atm. (absolute) until poisonous materials deposited on the catalyst are eliminated.

9. The method according to claim 6, wherein the catalyst is previously treated with at least one of hydrogen, oxygen and steam at a temperature of 350° to 750° C. under a pressure of 1 to 50 atm. (absolute) until poisonous materials deposited on the catalyst are eliminated.

10. The method according to claim 6, wherein the catalyst is previously contacted with an aqueous solution of an inorganic alkaline compound of an alkali metal or alkaline earth metal or mixtures thereof in a concentration of 0.001 to 10 N at a temperature of 5° to 250° C. for a period of 3 minutes to 80 hours and then treated with at least one of hydrogen, oxygen and steam at a temperature of 350° to 750° C. under a pressure of 1 to 50 atm. (absolute) until poisonous materials, deposited on the catalyst are eliminated.

11. A method for reactivation of a platinum group metal catalyst which comprises contacting a platinum group metal catalyst lowered in the catalytic activity as the result of having been used for hydro-cracking of hydrocarbons or alkanols with an aqueous solution or a reducing substance in a concentration of 0.01 to 10% by weight at a temperature of 5° to 250° C. for a period of 3 minutes to 80 hours and then treating the catalyst with an aqueous solution of an inorganic alkaline compound of alkali metal or alkaline earth metal or mixtures thereof in a concentration of 0.001 to 10 N at a temperature of 5° to 240° C. until the catalytic activity of the catalyst is substantially recovered.

* * * * *